(12) United States Patent
Wright et al.

(10) Patent No.: US 11,678,159 B2
(45) Date of Patent: Jun. 13, 2023

(54) DISTRIBUTED TRIGGER-BASED FUNCTION EXECUTION IN A MESH NETWORK

(71) Applicant: Charter Communications Operating, LLC, St. Louis, MO (US)

(72) Inventors: Ethan J. Wright, Denver, CO (US); Matthew James Wright, Denver, CO (US); Wystan Schmidt, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 46 days.

(21) Appl. No.: 16/592,716

(22) Filed: Oct. 3, 2019

(65) Prior Publication Data
US 2021/0105597 A1 Apr. 8, 2021

(51) Int. Cl.
| | |
|---|---|
| *H04W 4/60* | (2018.01) |
| *H04L 12/28* | (2006.01) |
| *H04W 4/20* | (2018.01) |
| *H04W 84/18* | (2009.01) |

(52) U.S. Cl.
CPC .......... *H04W 4/60* (2018.02); *H04L 12/2818* (2013.01); *H04W 4/20* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 10,368,360 B1* | 7/2019 | Dash | H04L 12/2803 |
| 2008/0143517 A1* | 6/2008 | Goffin | H04M 1/725 |
| | | | 379/207.02 |
| 2014/0136633 A1* | 5/2014 | Murillo, Jr. | H04L 51/24 |
| | | | 709/206 |
| 2014/0167929 A1* | 6/2014 | Shim | G08C 17/02 |
| | | | 340/12.5 |

(Continued)

OTHER PUBLICATIONS

"Lambda", Lambda Concepts, https://docs.aws.amazon.com/lambda/latest/dg/gettingstarted-concepts.html, 5 pages.

(Continued)

*Primary Examiner* — Adnan Baig
(74) *Attorney, Agent, or Firm* — The Marbury Law Group, PLLC

(57) ABSTRACT

Various embodiments describe methods, systems and devices for distributing trigger-based function execution in a mesh network. Various embodiments include detecting a trigger and determining whether the detected trigger matches one of a plurality of network events included in a trigger list accessible to the detecting node. In addition, whether a node associated with the detected trigger is available may be determined in response to determining the detected trigger matches one of the plurality of network events included in the trigger list. The node associated with the detected trigger may be configured to execute application logic for initiating at least one action from the mesh network in response to the detected trigger being detected. A trigger detection indicator associated with the detected trigger may be transmitted in response to determining the node associated with the detected trigger is a node other than the detecting node that is available.

15 Claims, 17 Drawing Sheets

(56) References Cited

U.S. PATENT DOCUMENTS

2019/0363902 A1* 11/2019 Gould .............. H04W 72/0446

OTHER PUBLICATIONS

"OpenSync", OpenSync Release 3.2 Documentation, https://www.opensync.io/documentation, 2 pages.

"OpenSync", OpenSync Release Notes, https://www.opensync.io/release-notes, 48 pages.

"OpenSync", OpenSync 3.2.4 Overview, https://www.opensync.io/documentation, Document ID: EUB-020-013-001, 80 pages, Nov. 15, 2021.

"OpenSync", OpenSync Requirements, https://www.opensync.io/requirements, 2 pages.

"OpenSync", OpenSync 3.2.2 Northbound API, https://www.opensync.io/documentation, Document ID: EDE-020-033-101, 101 pages, Sep. 21, 2021.

"OpenSync", OpenSync 3.2 Southbound API, https://www.opensync.io/documentation, Document ID: EDE-019-300-902, 308 pages, Oct. 18, 2021.

"OpenSync", OpenSync FSM Plugins, https://www.opensync.io/documentation, Document ID: EDE-021-030-501, 12 pages, Oct. 15, 2021.

* cited by examiner

DISTRIBUTED TRIGGER-BASED FUNCTION EXECUTION IN A MESH NETWORK

BACKGROUND

A mesh network is a local network topology in which the infrastructure nodes (e.g., bridges, switches, and other infrastructure devices) connect directly, dynamically, and non-hierarchically to as many other nodes as possible and cooperate with one another to efficiently route data from/to client devices (e.g., smart phones, tablets, laptop/desktop computers, smart appliances, security systems, game/entertainment systems, and other devices configured to connect to a mesh network). Every node in a mesh network is generally configured to handle all the same tasks and can participate in the relay of information, which creates a lack of dependency on any one node. Also, this contributes to fault-tolerance and reduced maintenance costs. However, having to configure all the nodes to handle every task may be inefficient, overburdening some nodes that do not need to support all the same operations and/or data as every other node.

SUMMARY

Various embodiments describe methods, systems and devices for distributing trigger-based function execution in a mesh network. Various embodiments include detecting a trigger at a node and determining whether the detected trigger matches one of a plurality of network events included in a trigger list accessible to the detecting node. In addition, the embodiments include determining whether a node associated with the detected trigger is available in response to determining the detected trigger matches one of the plurality of network events included in the trigger list. The node associated with the detected trigger (also referred to as a designated node) may be configured to execute application logic for initiating at least one action from the mesh network in response to the detected trigger being detected. A trigger detection indicator associated with the detected trigger may be transmitted in response to determining the node associated with the detected trigger is a node other than the detecting node that is available.

In some embodiments, application logic for generating the trigger detection indicator may be generated in response determining the node associated with the detected trigger is the detecting node. In addition, application logic associated with the detected trigger may be downloaded in response to determining no node is associated with the detected trigger or the node associated with the detected trigger is not available. Thereafter, the downloaded application logic for generating the trigger detection indicator. The trigger list may be updated in response to downloading the application logic. An updated trigger list may be transmitted to other nodes in the mesh network in response to downloading the application logic associated with the detected trigger. One or more updates to the trigger list may be synchronized with other nodes in the mesh network.

In various embodiments, a trigger designation may be received, where the trigger designation identifies at least one of a plurality of preestablished triggers used to initiate at least one action from the mesh network. In addition, a trigger subscription may be transmitted to a node of the mesh network, which trigger subscription is configured to cause hardware associated with at least one node within the mesh network to detect and report when the at least one of the plurality of preestablished triggers occurs. The trigger subscription may include an update to a trigger list that identifies a designated node configured to execute application logic for initiating at least one action from the mesh network. The designated node within the mesh network designated to handle operations for initiating the at least one action for inclusion in the update to the trigger list may be determined. In addition, the trigger subscription may be updated to include the update to the trigger list. Application logic associated with the at least one of the plurality of preestablished triggers may be transmitted to the designated node within the mesh network. The application logic may be configured to be initiated in response to receipt of an indication that the trigger was detected. A task initiation may be received in response to the at least one of the plurality of preestablished triggers being detected. Application logic for initiating at least one action from the mesh network may be executed. The at least one action may be responsive to at least one of the plurality of preestablished triggers being detected.

Further aspects include a mesh network node including a processor configured with processor-executable instructions to perform operations of any of the methods summarized above. Further aspects include a non-transitory processor-readable storage medium having stored thereon processor-executable software instructions configured to cause a processor of a mesh network node to perform operations of any of the methods summarized above. Further aspects include a processing device for use in a mesh network node and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
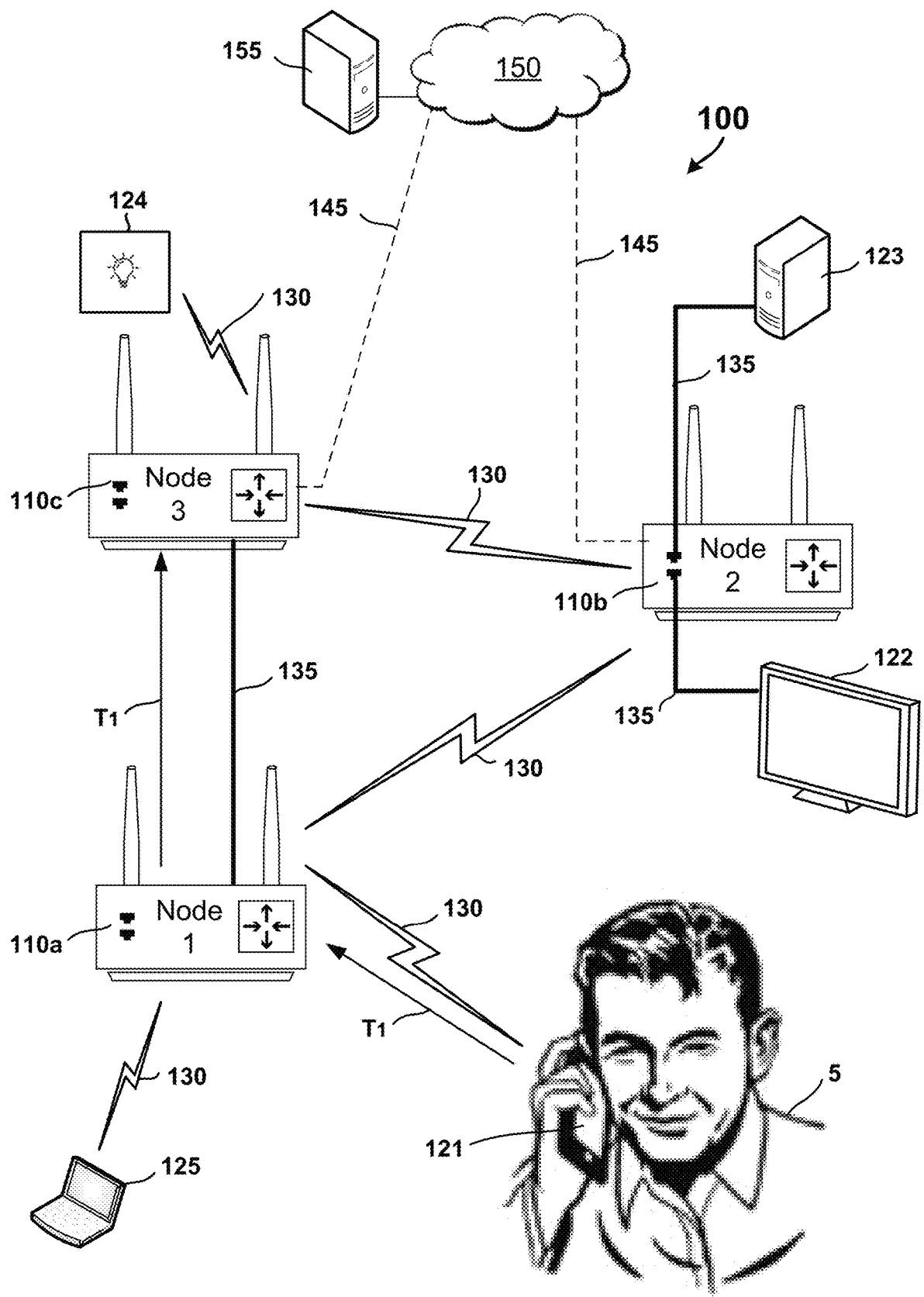
FIG. 1 is a schematic diagram of a mesh network 100 configured to handle distributed trigger-based function execution suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods and computing devices configured to implement the methods for distributing trigger-based function execution in a mesh network. Various embodiments provide a distributed application system that may enable a single node in a mesh network, such as in a home or business, or even a cloud-based node, such as a backend server, to handle or respond to network events. To distribute the applications that may be handled by the system, each node in the mesh network, or hardware associated therewith, may be configured to monitor for and report when particular triggers occur. A list of those triggers (i.e., a trigger list) may be maintained at the nodes, along with an identification of a designated node (e.g., inside the mesh network or in the cloud), for each trigger, that should be notified once the trigger is detected. A third-party application, maintained on and run from the designated node may be configured to initiate one or more tasks in response to being notified that the trigger was detected by any node in the mesh network. In this way, all the nodes in the mesh network do not need to be configured to process and deal with all the events associated with triggers. Also, the mesh network need not be limited by the capabilities of its weakest node. Further, the various embodiments may allow third-party application developers to select from a series of designated triggers to which their application logic will be bound. Third-party developers would no longer need to know specifics about the hardware topology of individual mesh networks, which may enable those third-party developers to more rapidly deploy software into a customer's home, business, or other premises. Using a common command plane, the various embodiments may enable new and customized network controls that introduce new features to the home automation markets.

As used herein, the term "trigger" refers to an input associated with a detectable network event, such that detection of the network event may be used to automatically initiate operations of application logic associated with the trigger. Detection of a trigger, such as changes in data, shifts in system state, or actions/inputs by/from users, under the appropriate circumstances, may be used to execute application logic for initiating a predefined task. Triggers may include a presence of packet streams or a packet stream of particular content, a user input, client device state changes, etc.

As used herein, the term "node" refers to a mesh network device or component that acts as a router to process and/or forward data packets to other nodes or acts as an access point for a client to access a remote server or network. A node may include a radio transmitter that functions in the same way as a wireless router, using Wi-Fi, Zigbee, and other standards to communicate with client devices and with each other. In addition, the node(s) may use wired connections for communicating. Nodes may be programmed with application logic (i.e., software) that tells them how to interact within the larger network and how to handle network events and/or execute customized third-party applications. Each node may be a distributed architecture router that includes a plurality of node components that are coupled to each other via communication links and/or a network topology. Each of these node components may include a control plane component, a forwarding plane component, or both.

As used herein, the term "computing device" is used to refer to any one or all of personal computers, laptop computers, rack mounted computers, routers, cellular telephones, smart phones, smart watches, smart buttons, smart appliances, personal or mobile multi-media players, personal data assistants (PDAs), tablet computers, smart books, palm-top computers, desk-top computers, wireless electronic mail receivers, cellular telephones, wireless gaming controllers, streaming media players (such as, ROKU®), smart televisions, DVRs, modems, satellite or cable set top boxes, smart remote control devices (i.e., television remote controls with sufficient processing capabilities), and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

FIG. 1 illustrates a schematic diagram of a mesh network 100 configured to handle distributed trigger-based function execution in accordance with various embodiments. The mesh network 100 includes base stations or routers that act as nodes 110a, 110b, 110c, (i.e., Node 1, Node 2, and Node 3, respectively) that exchange information continuously about network conditions with all adjacent nodes 110a, 110b, 110c across the mesh network 100 and optionally to a cloud-based backend 150. This allows nodes 110a, 110b, 110c that aren't sending or receiving data to each other to still be aware of the presence of each other node in the mesh network. In some cases, a node might send a packet of data to just one other node; in others, a weak signal and other factors might route the packet through other nodes to reach a designated node.

The nodes 110a, 110b, 110c may be configured to communicate with one another through wireless signals 130 and/or through wired connections 135. Also, one or more of the nodes 110a, 110b (e.g., Node 1 and Node 2) may be configured to communicate with the cloud-based backend 150 through a connection 145. Data and applications associated with the mesh network 100 may be stored in firmware on one or more of the nodes 110a, 110b, 110c or even at a cloud-based node 155 of the cloud-based backend 150. When a node acts as a wired access point (AP) to reach the Internet that node may be referred to as a backhaul node. Small wireless mesh networks, as illustrated in FIG. 1, handle backhaul without needing special configurations. In larger mesh networks, like those for towns, cities, large venues, and commercial/industrial facilities, certain nodes need to be dedicated as backhaul nodes. The other nodes may connect to the internet to transmit or receive data using one of the backhaul nodes.

Some nodes 110a, 110b, 110c may have single-band-at-a-time radios, and may behave more as smart extensions. Alternatively, or additionally, some nodes 110a, 110b, 110c may have radios supporting two or even three frequency bands, enabling mesh-dedicated bands to intra-node data, switching channels to reduce congestion, or mixing client data and "backhaul" data on the same channel. The mesh network 100 may programmed to automatically reconfigure itself when a node is lost or added to the network, in accordance with various embodiments.

The mesh network 100 may be configured to connect to one or more client devices, such as a cell phone 121, a smart-television 122, a local computing device 123, a smart-lighting system 124, and a laptop computer 125. The client devices (e.g., 121, 122, 123, 124, 125) may be configured to communicate with the nodes 110a, 110b, 110c also through wireless signals 130 and/or through wired connections 135.

In accordance with various embodiments, individual ones of the nodes 110a, 110b, 110c may store, maintain, and execute applications different from the applications stored, maintained and executed by other nodes 110a, 110b, 110c in the mesh network 100. Some of those applications may use anonymous functions (e.g., a lambda function) that include application logic for initiating a task programmed to automatically occur in response to an associated trigger being detected by any of the nodes in the mesh network 100. The anonymous functions may be a third-party application that bind a designated node (e.g., Node 3) or even a server 155 in the cloud-based backend 150 to execute application logic for initiating a task in response to a particular trigger being detected by any node 110a, 110b, 110c within the mesh network 100. The anonymous function may include what is referred to herein as a "trigger subscription," which configures the nodes 110a, 110b, 110c of the mesh network 100, or hardware connected to those nodes, to report each time a trigger included on a trigger list is detected. The trigger subscription may also identify the designated node to which the trigger detection should be reported.

The trigger subscription may include a trigger list or update to an existing trigger list, which gets distributed to, stored at, and used by the other nodes in the mesh network to inform those nodes about network events (i.e., triggers) for which they should monitor and report back to the designated node. The trigger list may include a plurality of triggers. In addition, the trigger list may identify a particular node or nodes associated with each trigger (i.e., a designated node) that should be advised when that trigger occurs. In this way, when a node 110a, 110b, 110c within the mesh network 100 detects that a trigger included on the trigger list has been detected, that node may report the event to the designated node. The designated node may then execute the application logic associated with the trigger subscription that may initiate a task or generate a task initiation message that will in-turn initiate the task.

Any node 110a, 110b, 110c in the mesh network 100 may be the designated node. The designation may be in response to an earlier request transmitted from that node for the trigger subscription or to be so designated. Alternatively, the designated node may be the first node in the mesh network 100 to receive and/or approve the download of the trigger subscription. The designated node may also be the only node configured as an access point (AP) to the internet or with sufficient download/upload speeds to handle transactions associated with the trigger subscription. As a further alternative, the designated node may not reside within the mesh network, but rather may reside in a remote network such as the cloud-based backend 150.

For example, the anonymous function may be part of a home automation program that turns on one or more lights (i.e., initiates a task), using the smart-lighting system 124, in response to a client device, such as the cell phone 121 operated by a client 5, connecting (i.e., an associated trigger) to the mesh network 100 via any node 110a, 110b, 110c in the mesh network. As another example, the home automation program may turn on one or more lights in response to a client device, such as a cell phone 121 operated by a client 5 connecting to the internet or the cloud-based backend 150. Thus, in this home automation example, the connection or attempted connection by the cell phone 121 to a communication access point may be a trigger T1 included on a trigger list. In this way, Node 1 (i.e., node 110a) may detect when the cell phone 121 connects to Node 1. Node 1, maintaining the trigger list, may be configured to report the trigger T1, if/when detected, to Node 3 (i.e., node 110c). Node 3 is connected to the smart-lighting system 124 and may initiate the task. Once notified that the trigger T1 was detected, Node 3 may execute application logic for generating a task initiation signal that causes the smart-lighting system 124 to turn on one or more lights. While Node 1 does not perform the task of turning on the lights, nor does Node 1 store or maintain the home lighting application, Node 1 does maintain the trigger list and notifies the designated Node 3 upon the detection of the trigger T1.

Figure 2:
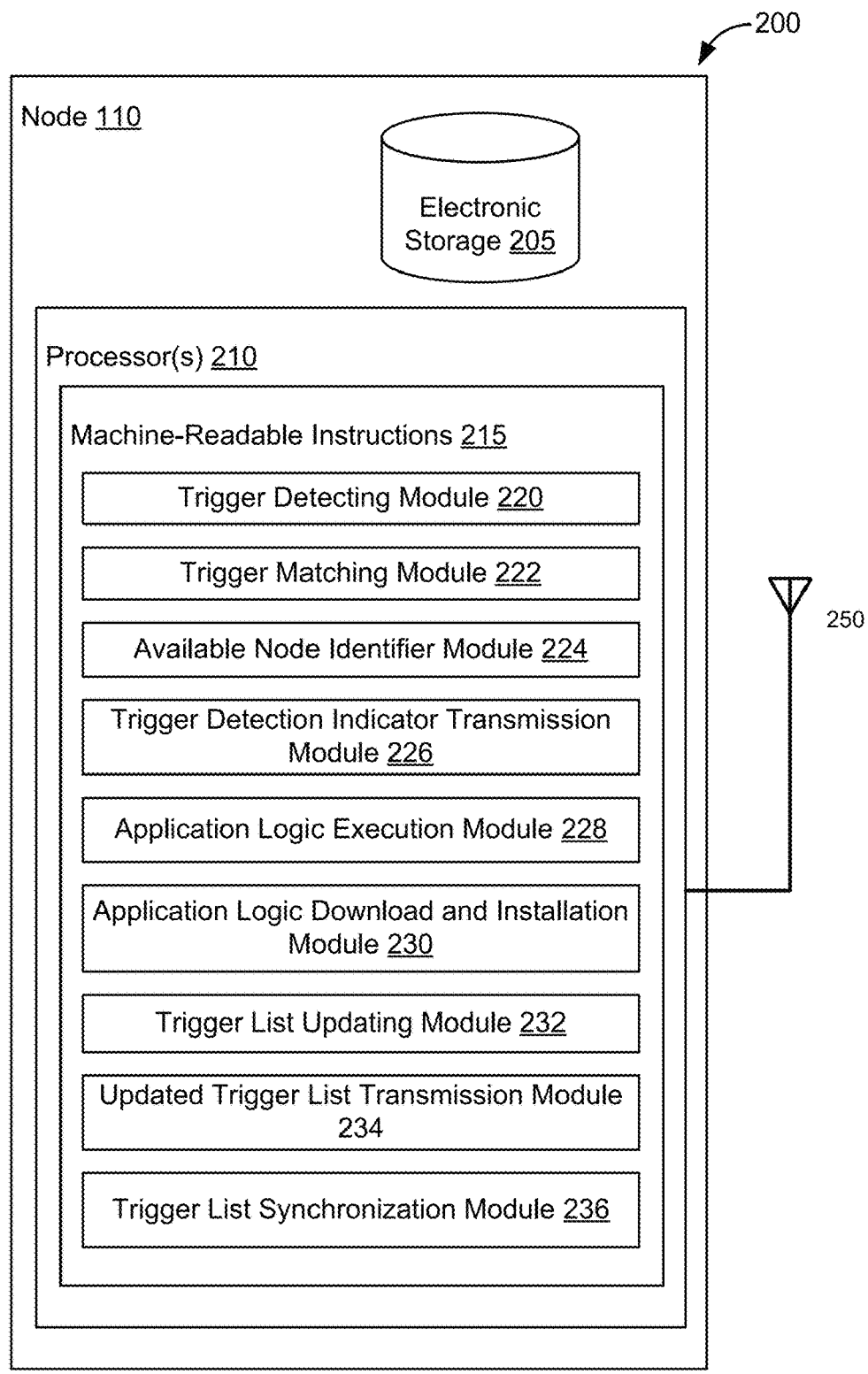
FIG. 2 is a component block diagram illustrating a node in a mesh network that may be used to implement various embodiments.

FIG. 2 illustrates a schematic diagram of a node 110 (any of nodes 110*a*, 110*b*, or 110*c*) configured for distributing trigger-based function execution in a mesh network. In various embodiments, the node 110 may include one or more memory storage devices 205 and one or more processors 210.

The node 110 may be configured by machine-readable instructions (MRI) 215. The MRI 215 may include one or more instruction modules. The instruction modules may include computer program modules. The instruction modules may include one or more of a trigger detection module 220, a trigger matching module 222, an available associated node identifier module 224, a trigger detection indicator transmission module 226, an application logic execution module 228, an application logic download and installation module 230, a trigger list updating module 232, an updated trigger list transmission module 234, a trigger list synchronization module 236, or other instruction modules.

The trigger detection module 220 may be configured to detect network events associated with one or more triggers included on a trigger list. For example, the trigger list may include network topology events, such as when a node and/or client device leaves the network, when a node and/or client device joins the network, when a client device joins the network using the guest passphrase, or when a passphrase of a client device expires while that client device is currently connected. The trigger list may additionally, or alternatively, include particular application streams that may be detected, like when Roku TV® begins streaming Netflix®, when a surveillance camera starts uploading video, when a speaker begins streaming from a music service (e.g., Spotify®, Pandora®, or Amazon® Music), or when a particular mobile computing device (e.g., a; child's cell phone) has streamed more than 3 hours of video. As a further alternative, or additionally, the trigger list may include events associated with client devices accessing particular internet domains, such as pornographic web sites, malicious websites with known malware, or when a client device attempts to access a particular category of website (e.g., an advertisement website) more than a threshold number of times (e.g., ≥3×). This list of possible trigger events are merely illustrative and not meant to limit the scope of the disclosed embodiments. Additional trigger events within the scope of the disclosed embodiments are contemplated.

Once a trigger is detected, the trigger detection module 220 may initiate the transmission of an indication of such to the trigger matching module 222.

The trigger matching module 222 may be configured to determine whether the detected trigger matches one of a plurality of network events included in a trigger list accessible to the detecting node.

The available node identifier module 224 may be configured to determine whether a node associated with the detected trigger is available in response to determining the detected trigger matches one of the plurality of network events included in the trigger list. Initially, the available node identifier module 224 may access the trigger list to determine what node is designated as the node to which the trigger detection should be reported. The designated node associated with the detected trigger may be configured to execute application logic for initiating at least one action from the mesh network in response to the detected trigger being detected. The available node identifier module 224 may determine whether the designated node is available after identifying the designated node from the trigger list. If available, the designated node may be targeted for notification regarding the trigger detection. Otherwise, either an alternate node may be considered, if provided in the trigger list or as a default designation, or an indication may be registered that no node is associated with the detected trigger or that the node associated with the detected trigger is not available, as determined.

The trigger detection indicator transmission module 226 may be configured to transmit, to the designated node, a trigger detection indicator associated with the detected trigger in response to determining the node associated with the detected trigger is a node other than the detecting node and is available.

The application logic execution module 228 may be configured to execute application logic for generating a task initiation in response determining the node associated with the detected trigger is the detecting node. Various tasks (i.e., actions) may be initiated by the application logic execution module 228. For example, the tasks may include network topology actions, such as steering or locking client device to use a particular node, removing a temporary or permanent password or passphrase, revoking network privileges from a client device, or sending a password or passphrase to a client device. The tasks may additionally, or alternatively, include particular application stream actions. For example, the tasks may include blocking an application stream from a streaming service, like Netflix®, from a particular client device, like a child's tablet or cell phone, prioritizing a particular application stream, like HBO® for a Roku TV®, and/or throttling (i.e., slowing) a particular application stream, such as YouTube® for a child's mobile device. As a further alternative, or additionally, the tasks may relate to how or when client devices access particular internet domains. For example, the tasks may include blocking access to various forms of "Entertainment" from a particular client device, like a child's cell phone, blocking advertisements targeted to a client device, pausing an internet to a client device, and/or redirecting internet requests to a website with customized messaging, for example, "Come to dinner!" for household residents.

The application logic download and installation module 230 may be configured to download application logic associated with trigger subscriptions. The download and installation may be part of an initial mesh network configuration, configuration of a designated node, or in response to determining no node is associated with the detected trigger or the node associated with the detected trigger is not available.

The trigger list updating module 232 may be configured to store a new trigger list or update an existing trigger list in response to downloading the application logic.

The updated trigger list transmission module 234 may be configured to transmit, to other nodes 110 (i.e., 110*a*, 110*b*) in the mesh network 100, an updated trigger list. The updated trigger list may be transmitted as part of an initial mesh network configuration, configuration of a designated node, or in response to downloading the application logic associated with the trigger subscription or detected trigger. The updated trigger list transmission module 234 may use a transceiver 250 of the node 110, which is configured to transmit updated trigger lists to other nodes and/or to the cloud-based backend (e.g., 150).

The trigger list synchronization module 236 may be configured to synchronize one or more updates to the trigger list with other nodes in the mesh network. As with the updated trigger list transmission module 234, the trigger list synchronization module 236 may use the transceiver 250 to transmit updated trigger lists to other nodes and/or to the cloud-based backend.

Figure 3:
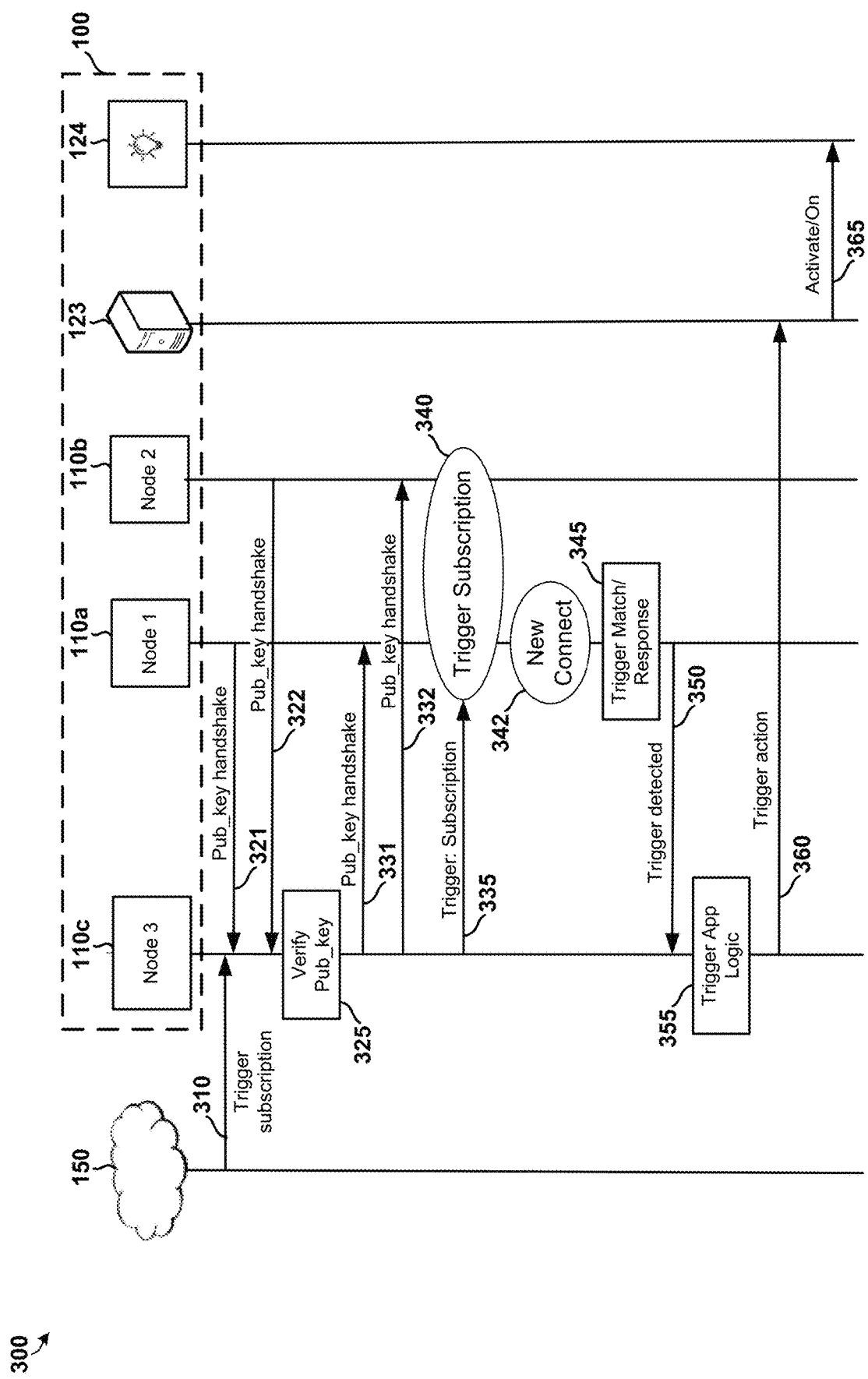
FIG. 3 is a communication message flow diagram of a trigger subscription and execution process suitable for use with various embodiments.

FIG. 3 illustrates components and communication message flows in a system 300 configured to distribute trigger-based function execution in a mesh network in accordance with an embodiment. In the example illustrated in FIG. 3, the system 300 is implementing and executing a trigger subscription. The system 300 includes a plurality of nodes 110a, 110b, 110c (e.g., Node 1, Node 2, and Node 3, respectively) in the mesh network 100, the cloud-based backend 150, and two client devices, namely the local computing device 123 and the smart-lighting system 124.

In message 310, the cloud-based backend 150 may broadcast or send a trigger subscription to a designated node, for example, as illustrated in FIG. 3 Node 3 110c. The trigger subscription message 310 may be an anonymous function that includes application logic for initiating a task programmed to automatically occur in response to detection of an associated trigger. For example, the trigger subscription message 310 may include a home automation function (i.e., an application logic) that turns on one or more lights (i.e., initiates a task), using the smart-lighting system 124 in the mesh network 100, in response to a client device connecting to the internet (i.e., a detected trigger). The anonymous function, may bind Node 3 110c to execute application logic for getting the smart-lighting system 124 to turn on one or more lights once any node in the mesh network reports that a client device has connected to the internet.

Once the designated node downloads the trigger subscription, the designated node may distribute the trigger list or trigger list update to the other nodes. Also, if one or more nodes are added to the mesh network 100, the designated node may distribute the trigger list or trigger list update to those added nodes, if appropriate.

In messages 321, 322, Nodes 1 and 2 (i.e., 110a, 110b), respectively, may send handshake messages to Node 3 (i.e., the designated node 110c) for negotiating a secure connection there between. The messages 321, 322 may include public key authentication (i.e., "Pub_key") to ensure secure communications. In block 325, in response to receiving the message (e.g., 321, 322), a processor in Node 3 110c may verify (i.e., authenticate) the public key using preconfigured mesh network settings and/or information provided from the cloud-based backend 150 in connection with the trigger subscription message 310. Once the public key is verified, Node 3 110c may return corresponding handshake messages 331, 332 back to Node 1 110a, which may include network and lease information (e.g., an IP address, etc.) that enables secure communications between the two nodes Node 1 and Node 3 (110a, 110c). This secure handshake procedure (i.e., messages 321/331 and 322/332) may be performed each time the nodes 110a, 110b, 110c establish connections with one another, since the nodes 110a, 110b, 110c need not maintain persistent connections between one another. The handshake procedure may use hypertext transfer protocol secure (HTTPS), transport layer security (TLS), or other secure messaging protocol as informed by the certificates and chain of trust installed when the mesh network is configured.

In message 335, Node 3 110c may transmit to Node 1 110a and Node 2 110b a trigger subscription that configures Node 1 110a and Node 2 110b, or hardware connected to those nodes, to report each time a trigger included on a trigger list is detected.

In block 340, Node 1 110a and Node 2 110b register the new trigger subscription (i.e., "Trigger Subscription"), which configures Node 1 110a and Node 2 110b 2 to report if/when any trigger on the trigger list is detected. Node 1 110a and Node 2 110b may not be configured to detect every trigger included on the trigger list, but the nodes will be ready to report those triggers they are configured to detect.

As illustrated in FIG. 3, in block 342, Node 1 110a detects a new connection by a client device (i.e., a "New Connect"). One of skill in the art may understand that Node 2 110b may also detect a new condition by a client device.

In block 345, a processor in Node 1 110a may determine whether the New Connect event (i.e., the detected trigger) matches one of a plurality of network events included in the trigger list. In response to determining the detected trigger matches one of the plurality of network events included in the trigger list, in block 345 the processor of Node 1 110a may also determine whether a node associated with the detected trigger is available. The designated node (i.e., Node 3 110c) associated with the detected trigger may be configured to execute application logic for initiating at least one action from the mesh network in response to the detected trigger being detected.

In message 350, Node 1 110a may transmit to Node 3 110c a trigger detection indicator associated with the detected trigger in response to the processor in Node 1 1110a determining the node associated with the detected trigger is Node 3 110c and Node 3 110c is available.

In block 355, the processor in Node 3 110c may execute application logic for generating a task initiation. In particular, the application logic may generate and transmit the message 360, which includes a task initiation signal configured to get the local computing device 123 that manages the smart-lighting system 124 to turn the lights on.

In message 365, the local computing device 123 sends an activate/on signal to the smart-lighting system 124, in response to the local computing device 123 receiving the task initiation signal from Node 3 110c. The activate/on signal is configured to turn lights on.

Figure 4:
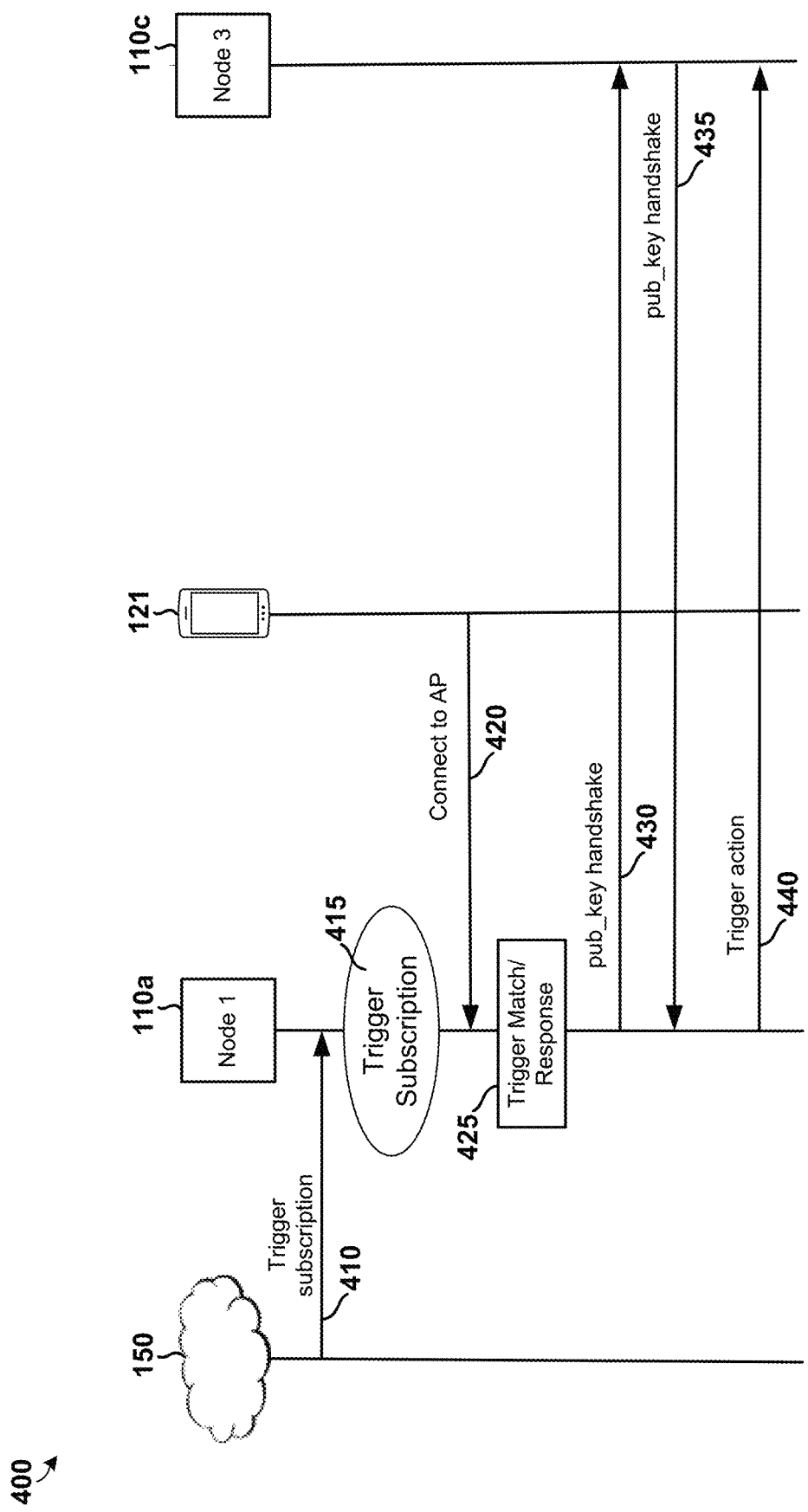
FIG. 4 is a communication message flow diagram of an access point forwarding process suitable for use with various embodiments.

FIG. 4 illustrates components and communication message flows in a system 400 configured to distribute trigger-based function execution in a mesh network in accordance with an embodiment. In the example illustrated in FIG. 4, the system 400 is illustrated executing a trigger subscription that forwards internet access to a particular AP. The system 400 includes a plurality of nodes 110a and 110c (e.g., Node 1 and Node 3), the cloud-based backend 150, and one client device, for example, a cell phone 121. In this example, each node (i.e., Node 1 110a and Node 3 110c) may act as an access point AP.

In message 410, the cloud-based backend 150 may broadcast or send a trigger subscription to a designated node, which is Node 1 110a in this instance. The trigger subscription message 410 may include application logic that forwards internet access to a particular node, like Node 3 110c, in the mesh network.

In block 415, Node 1 110a registers the new trigger subscription (i.e., "Trigger Subpt'n"), which configures Node 1 110a to not only detect attempts to reach an AP, but also to forward any of those attempts to Node 3 110c.

In message 420, the cell phone 121 is attempting to contact to an AP (e.g., Node 1 110a).

In block 425, the processor of Node 1 110a may determine whether the client device 121 attempting to reach an AP (i.e., the detected trigger) matches one of a plurality of network events included in the trigger list. In response to determining the detected trigger matches one of the plurality of network events included in the trigger list, in block 345 the processor of Node1 110a may also determine whether a node associated with the detected trigger is available. In this instance, the node associated with the detected trigger is Node 3 110c. Thus, Node 1 110a, executing application logic associated with the trigger subscription, will initiate actions in response to the detected trigger being detected.

In message 430, Node 1 may send a handshake message to Node 3 (i.e., the designated node 110c) for negotiating a secure connection there between. In response to receiving the message 430, a processor in Node 3 110c may verify (i.e., authenticate) the public key using preconfigured mesh network settings. Once the public key is verified, Node 3 may return a corresponding handshake message, in message 435, back to Node 1 110a.

In message 440, the application logic may generate and transmit a task initiation signal that forwards AP access, requested by the cell phone 121, to Node 3 110c.

Figure 5:
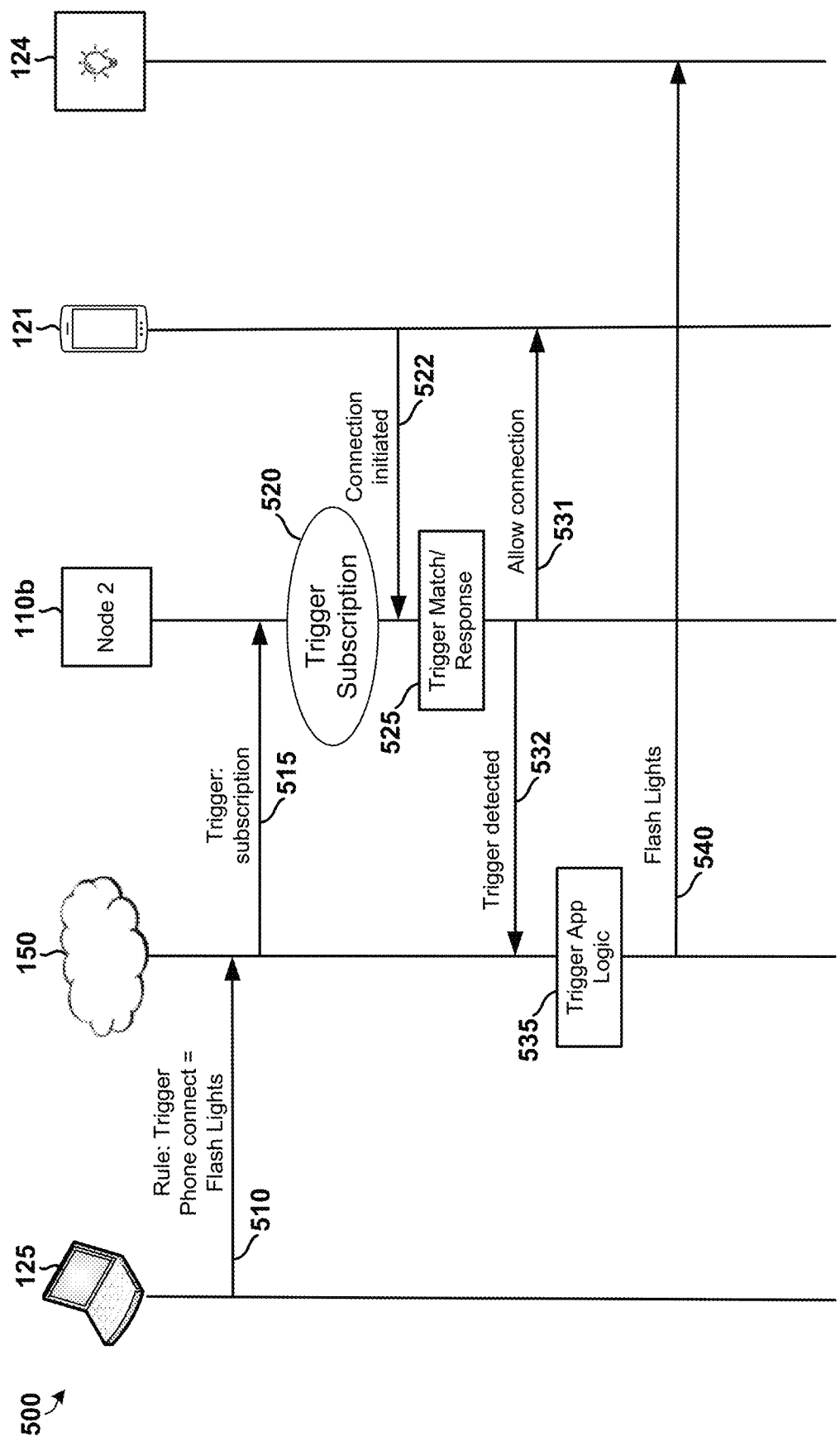
FIG. 5 is a communication message flow diagram of a trigger subscription and execution process suitable for use with various embodiments.

FIG. 5 illustrates components and communication message flows in a system 500 configured to distribute trigger-based function execution in a mesh network in accordance with an embodiment. In the example illustrated in FIG. 5, the system 500 is illustrated executing a trigger subscription that performs a home automation task when a client device joins the network. The system 500 includes one node 110b (e.g., Node 2) that is local, the cloud-based backend 150 that may include a cloud-based node (e.g., 155), and two client devices, for example, a cell phone 121 and the smart-lighting system 124.

In message 510, a client device, namely the laptop computer 125, may send one or more rules for creating a trigger subscription (i.e., "Rule: Trigger Phone connect=Flash Lights"). In this instance, the rules are designed for a home automation system to flash lights on and off (e.g., in a room a parent is likely to be, like the master bedroom or a home office) in response to a particular client device 121 (e.g., a child's cell phone) connects with the mesh network. This type of routine may be useful for letting occupants of the house know when someone carrying a device that connects to the network has arrived home or when that device has been turned on.

In message 515, the cloud-based backend 150 may broadcast or send a trigger subscription to a designated node, which is Node 2 110b in this instance. The trigger subscription message 515 may include application logic, which activates a home automation function that flashes lights is a set of designated rooms with a smart-lighting system 124.

In block 520, Node 2 110b registers the new trigger subscription (i.e., "Trigger Subpt'n"), which configures Node 2 110b to not only detect when the cell phone 121 initiates a connection to the mesh network, but also to allow the network connection and forward a task initiation message that flashes the lights.

In message 522, the cell phone 121 is initiating a connection to the home mesh network.

In block 525, the processor of Node 2 110b may determine whether the client device 121 attempting to connect to the home mesh network (i.e., the detected trigger) matches one of a plurality of network events included in the trigger list. In response to determining the detected trigger matches one of the plurality of network events included in the trigger list, in block 535 the processor of Node 2 110b may also determine whether a node associated with the detected trigger is available. In this instance, the node associated with the detected trigger is a cloud-based node in the cloud-based backend 150. Thus, Node 2 110b, executing application logic associated with the trigger subscription, will initiate actions in response to the detected trigger being detected. Namely, a processor of Node 2 110b will transmit message 531 to the cell phone 121, which allow the connection. In addition, a processor of Node 2 110b will also transmit a trigger detection indicator, as message 532 to the cloud-based node in the cloud-based backend 150.

In block 535, the processor in the cloud-based node in the cloud-based backend 150 may execute application logic for generating a task initiation. In particular, the application logic may generate and transmit the message 540, which includes a task initiation signal configured to make the smart-lighting system 124 flash lights or at least flash particular lights, like those in one or more designated rooms.

Figure 6:
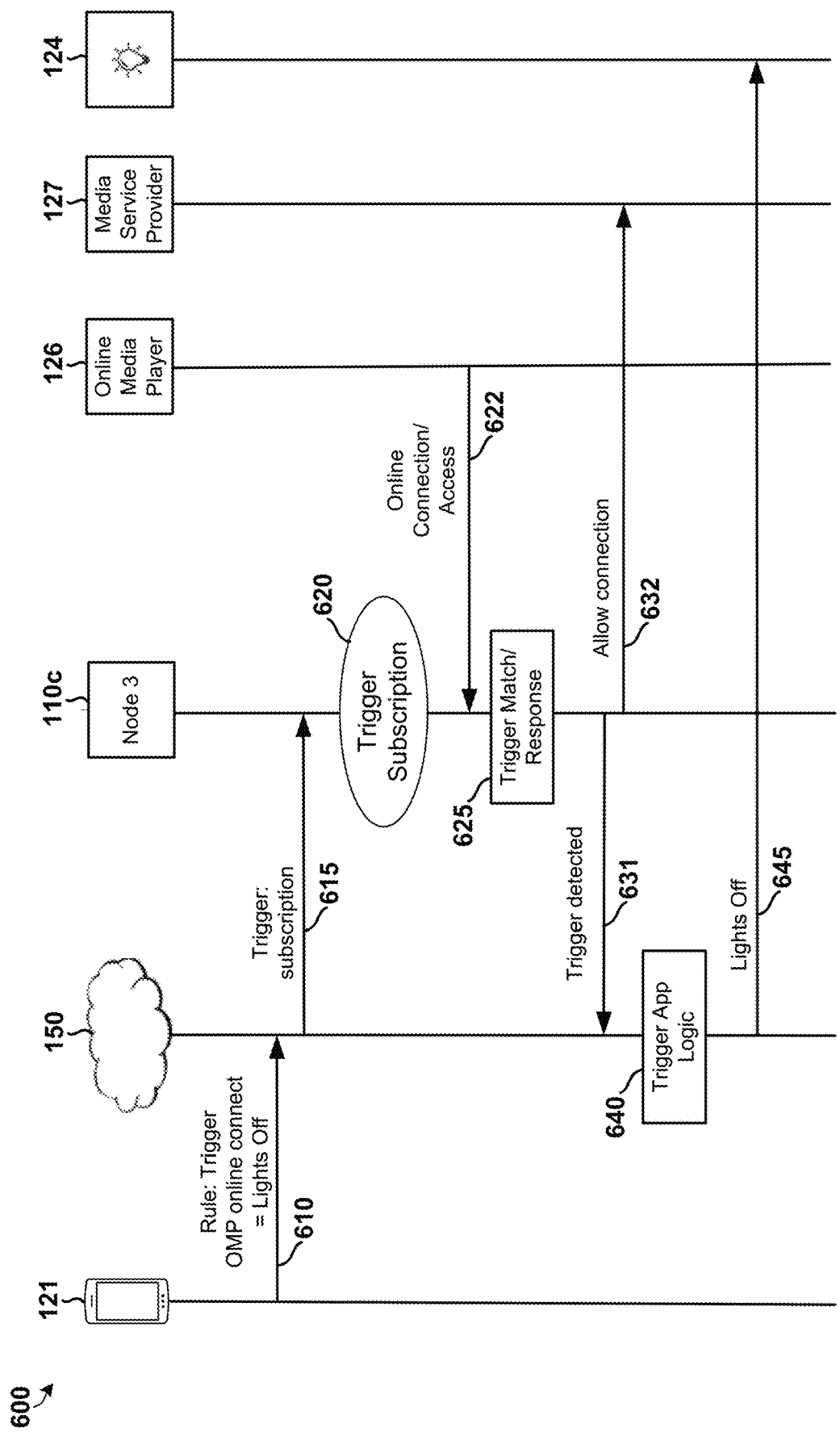
FIG. 6 is a communication message flow diagram of a trigger subscription and execution process suitable for use with various embodiments.

FIG. 6 illustrates components and communication message flows in a system 600 configured to distribute trigger-based function execution in a mesh network in accordance with an embodiment. In the example illustrated in FIG. 6, the system 600 is illustrated executing a trigger subscription that performs a home automation task when a video streams is initiated. The system 600 includes one node 110c (e.g., Node 3), the cloud-based backend 150 that may include a cloud-based node (e.g., 155), and four client devices, for example, a cell phone 121, the smart-lighting system 124, an online media player 126, and a media service provider 127.

In message 610, a client device, namely the cell phone 121, may send one or more rules for creating a trigger subscription (i.e., "Rule: Trigger OMP online connect=Lights Off"). In this instance, the rules are designed for a home automation system to turn lights off (e.g., in a media room) in response to an online media player (OMP) connecting to the mesh network and/or attempting to get online Internet access to the media service provider. This type of routine may be useful for turning off or dimming lights when someone starts streaming or trying to stream a movie, program, or other streaming video entertainment.

In message 615, the cloud-based backend 150 may broadcast or send a trigger subscription to a designated node, which is Node 3 110c in this instance. The trigger subscription message 615 may include application logic, which activates a home automation function that turns down or off lights is a designated room with a smart-lighting system 124, in addition to enabling the necessary internet access to the media service provider 127.

In block 620, Node 3 110c registers the new trigger subscription (i.e., "Trigger Subcrpt'n"), which configures Node 3 110c to not only detect when the online media player 126 initiates an online connection or access to the internet, but also to allow the internet connection and forward a task initiation message to get the lights to turn off, as programmed in the trigger subscription rules.

In message 622, the online media player 126 initiates an online connection to gain access to the internet.

In block 625, the processor of Node 3 110c may determine whether the online media player 126 attempting to connect to the internet (i.e., the detected trigger) matches one of a plurality of network events included in the trigger list. In response to determining the detected trigger matches one of the plurality of network events included in the trigger list, in block 625 the processor of Node 3 110c may also determine whether a node associated with the detected trigger is available. In this instance, the node associated with the detected trigger is a cloud-based node in the cloud-based backend 150. Thus, Node 3 110c, executing application logic associated with the trigger subscription, may initiate actions in response to the detected trigger being detected. Namely, a processor of Node 3 110c may transmit a trigger detection indicator, as message 631 to the cloud-based node in the cloud-based backend 150. In addition, a processor of Node 3 110c may also transmit message 632 to the media service provider 127, which allows the connection and subsequent streaming of media from the media service provider 127.

In block 640, the processor in the cloud-based node in the cloud-based backend 150 may execute application logic for generating a task initiation. In particular, the application logic may generate and transmit the message 645, which includes a task initiation signal configured to make the smart-lighting system 124 turn off one or more designated lights.

Figure 7:
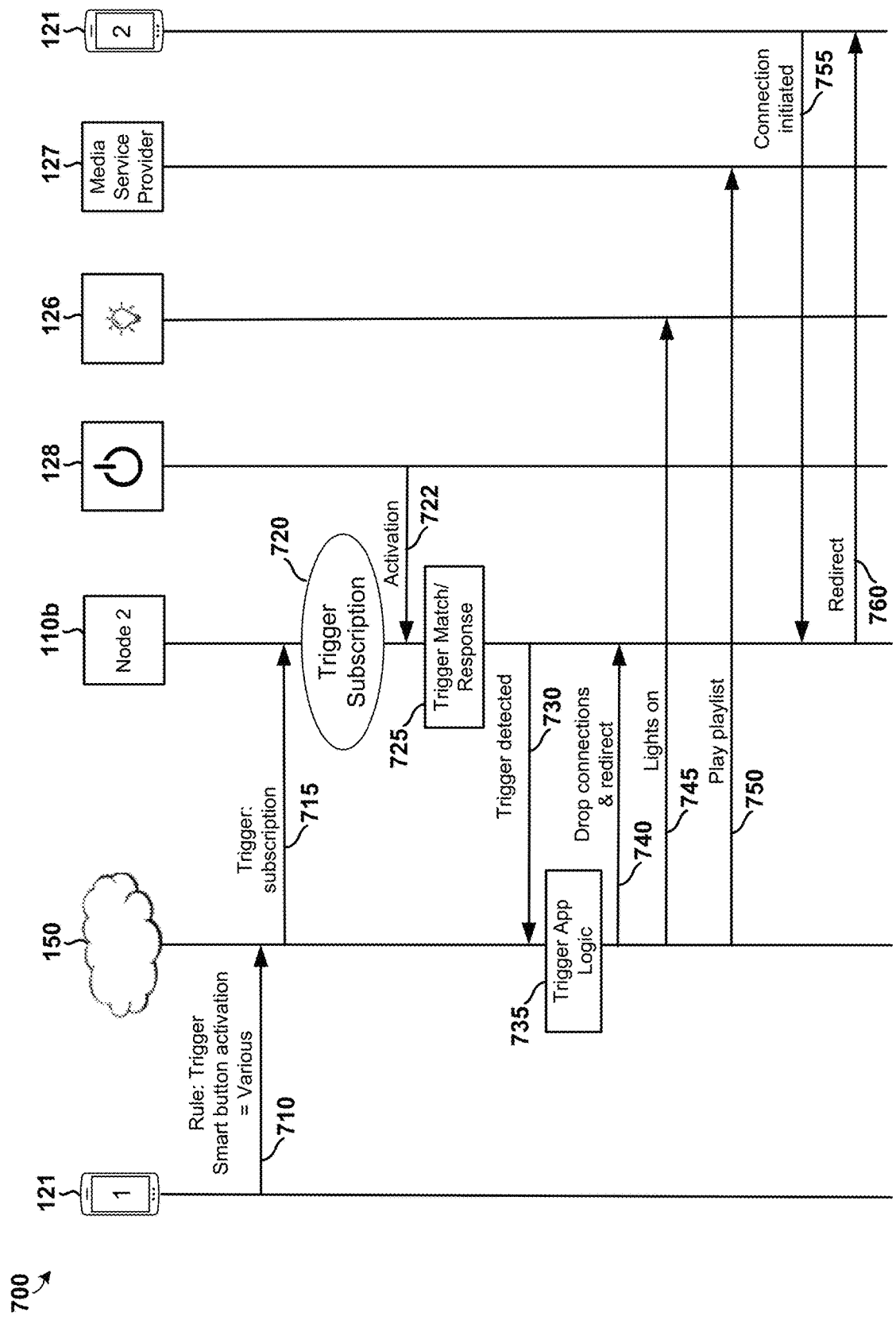
FIG. 7 is a communication message flow diagram of a trigger subscription and execution process suitable for use with various embodiments.

FIG. 7 illustrates components and communication message flows in a system 700 configured to distribute trigger-based function execution in a mesh network in accordance with an embodiment. In the example illustrated in FIG. 7, the system 700 is illustrated executing a trigger subscription that performs coordinated home automation tasks when a smart button is activated. The system 700 includes one node 110b (e.g., Node 2), the cloud-based backend 150 that may include a cloud-based node (e.g., 155), and five client devices, for example, two cell phones 121, the smart-lighting system 124, the media service provider 127, and a smart button 128.

In message 710, a client device, namely the first ("1") cell phone 121, may send one or more rules for creating a trigger subscription (i.e., "Rule: Trigger Smart button activation=Various"). In this instance, the rules are designed for a series of actions to be initiated by activation of a programmed smart button. In particular, all network connections to the mesh network are momentarily dropped, a home automation system turns lights on (e.g., in a kitchen/dining room), starts streaming music from a media service provider (e.g., dinner music) and redirects dropped client devices, like the second ("2") cell phone 121, in response to activation of the smart button 128. This type of routine may be useful for letting the kids know dinner is ready and setting the mood in the dining room or kitchen.

In message 715, the cloud-based backend 150 may broadcast or send a trigger subscription to a designated node, which is Node 2 110b in this instance. The trigger subscription message 715 may include application logic, which activates a home automation function that turns lights on is a designated room with a smart-lighting system 124, enables the necessary internet access to the media service provider 127, and redirects other client devices, like the second cell phone 121 to a web address that displays a message, for example, "Dinner is ready!"

In block 720, Node 2 110b registers the new trigger subscription (i.e., "Trigger Subcrpt'n"), which configures Node 2 110b to not only detect the activation of the smart button 128, but also sends a task initiation message that tells the cloud-based node to starts the various actions associated with this trigger subscription.

Message 722 indicates that the smart button 128 has been activated.

In block 725, the processor of Node 2 110b may determine whether the smart button 128 being activated (i.e., the detected trigger) matches one of a plurality of network events included in the trigger list. In response to determining the detected trigger matches one of the plurality of network events included in the trigger list, in block 725 the processor of Node 2 110b may also determine whether a node associated with the detected trigger is available. In this instance, the node associated with the detected trigger is a cloud-based node in the cloud-based backend 150. Thus, Node 2 110b, executing application logic associated with the trigger subscription, will initiate actions in response to the detected trigger being detected. Namely, a processor of Node 2 110b may transmit a trigger detection indicator, as message 730 to the cloud-based node in the cloud-based backend 150.

In block 735, the processor in the cloud-based node in the cloud-based backend 150 may execute application logic for generating a plurality of task initiations. In particular, the application logic may generate and transmit the message 740, which causes Node 2 110b to drop connections to any connected client devices (i.e., cell phone 121) and to redirect any client devices (i.e., cell phones 121) that attempt to reconnect to a designated web site that displays a message. This message may be, for example, "Dinner is ready!". In addition, the application logic may generate and transmit the message 745, which includes a task initiation signal configured to make the smart-lighting system 124 turn on one or more designated lights, such as the dining room lights. Further, the application logic may generate and transmit the message 750, which includes a task initiation signal configured to make the media service provider 127 start streaming a particular music playlist.

Having lost a connection to the local mesh network, the second cell phone 121 may transmit a message 755, which includes a request to connect to the network and/or an attempt to reach an AP. The application logic of the trigger subscription registered at Node 2 110b may then generate and transmit the message 760, which redirects the second cell phone 121 to a designated web site that displays a message.

Figure 8:
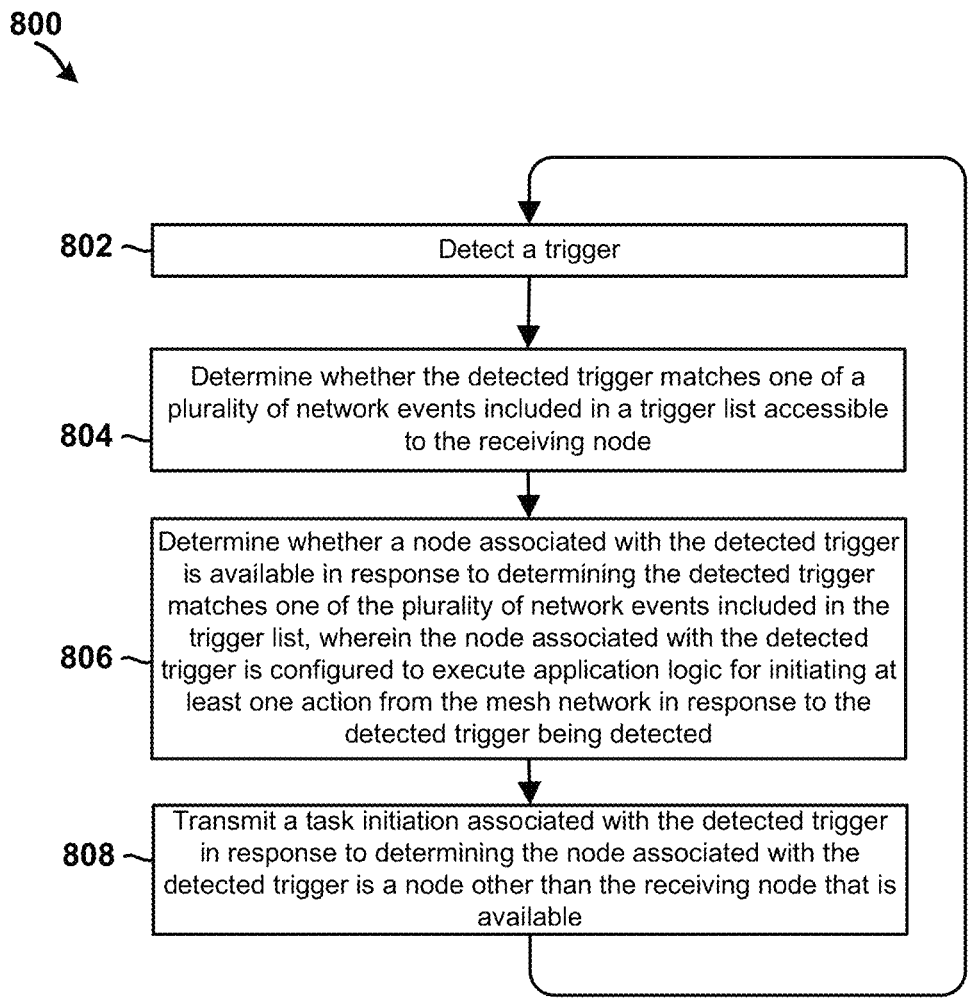
FIG. 8 is a process flow diagram illustrating an embodiment method for distributing trigger-based function execution in a mesh network suitable for use with various embodiments.

FIG. 8 illustrates an embodiment method 800 for distributing trigger-based function execution in a mesh network, in accordance with various embodiments. With reference to FIGS. 1-8, the operations of the method 800 may be performed by a processor (e.g., 210) of a node (e.g., 110a-c, 155), computing device (e.g., 121-128), or server associated with a mesh network (e.g., 100).

In block 802, the processor of a detecting node (e.g., Nodes 1-3, 110a-c) in the mesh network may detect a trigger. The trigger may correspond to an input associated with a detectable network event.

In block 804, the processor of the detecting node (e.g., Nodes 1-3, 110a-c) may determine whether the detected trigger matches one of a plurality of network events included in a trigger list accessible to the detecting node.

In block 806, the processor of the detecting node (e.g., Nodes 1-3, 110a-c) may determine whether a node associated (i.e., designated node) with the detected trigger is available in response to determining, in block 804, that the detected trigger matches one of the plurality of network events included in the trigger list. The node associated with the detected trigger may be configured to execute application logic for initiating at least one action from the mesh network in response to the detected trigger being detected.

In block 808, the processor of the detecting node (e.g., Nodes 1-3, 110a-c) may transmit, to the available designated node, a trigger detection indicator associated with the detected trigger in response to determining, in block 806, that the node associated with the detected trigger is a node other than the detecting node that is available.

In some embodiments, the processor of the detecting node (e.g., Nodes 1-3, 110a-c) may repeat any or all of the operations in blocks 802 through 808 to repeatedly or continuously detect and report triggers and transmit a trigger detection indicator associated with the detected trigger in response to determining the node associated with the detected trigger is a node other than the detecting node that is available.

Figure 9:
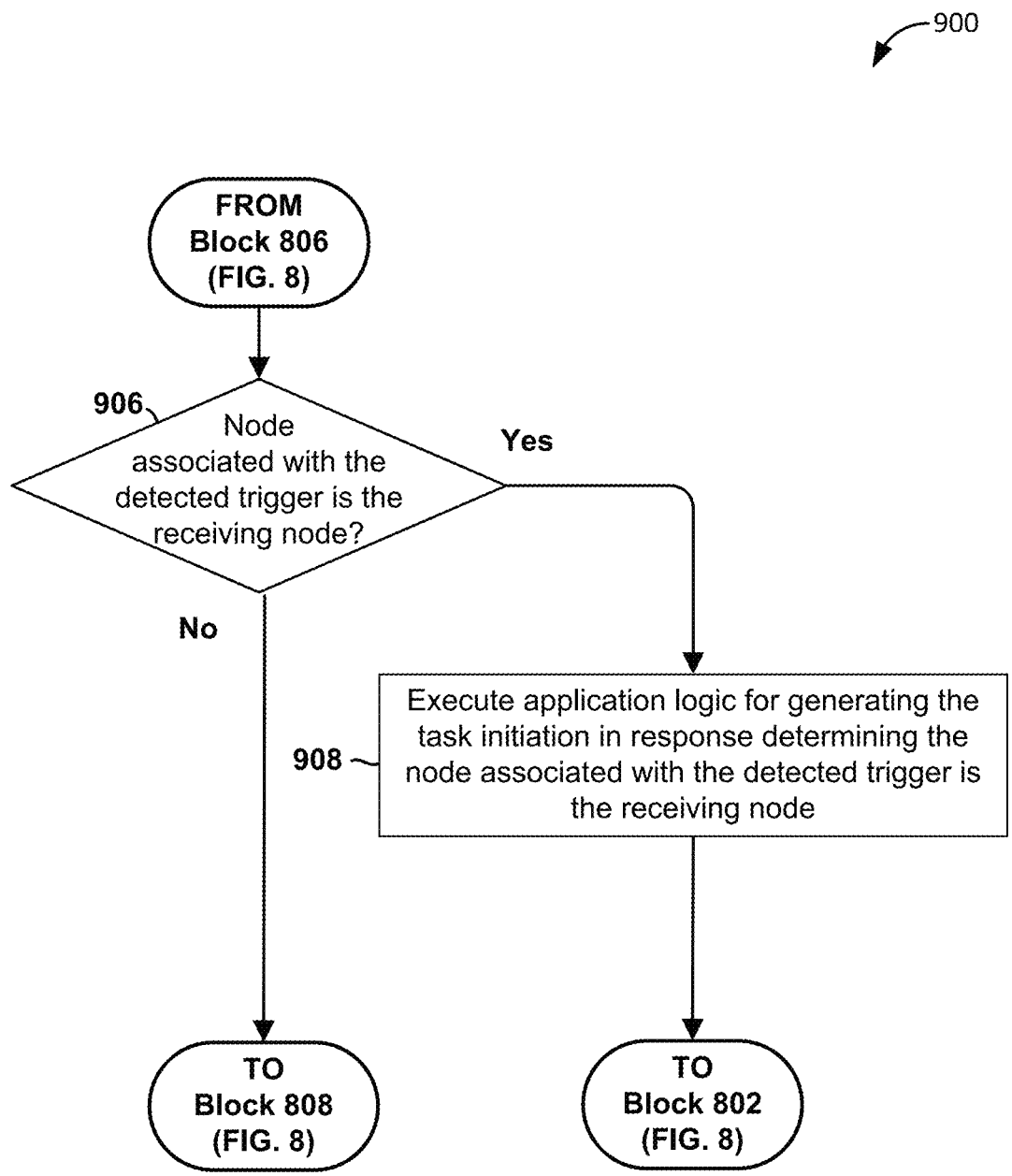
FIG. 9 is a process flow diagram illustrating an embodiment method for distributing trigger-based function execution in a mesh network suitable for use with various embodiments.

FIG. 9 illustrates an embodiment method 900 of example operations that may be performed as part of the method 800

(FIG. 8) for distributing trigger-based function execution in a mesh network. With reference to FIGS. 1-9, the operations of method 900 may be performed by a processor (e.g., 210) of a node (e.g., 110a-c, 155), computing device (e.g., 121-128), or server associated with a mesh network (e.g., 100).

In some implementations following the operations of block 806 (FIG. 8), the processor may determine in determination block 906 whether a node associated with the detected trigger is the detecting node. In response to the processor of the detecting node determining that the node associated with the detected trigger is the detecting node (i.e., determination block 906="Yes"), the processor of the detecting node may execute application logic for generating a task initiation in block 908. Following the operations of block 908, the processor of the detecting node (i.e., designated node) may perform the operations of block 802 (FIG. 8). In response to the processor of the detecting node (e.g., Nodes 1-3, 110a-c) determining the node associated with the detected trigger is not the detecting node (i.e., determination block 906="No"), the processor may follow the operations of block 808 (FIG. 8).

Figure 10:
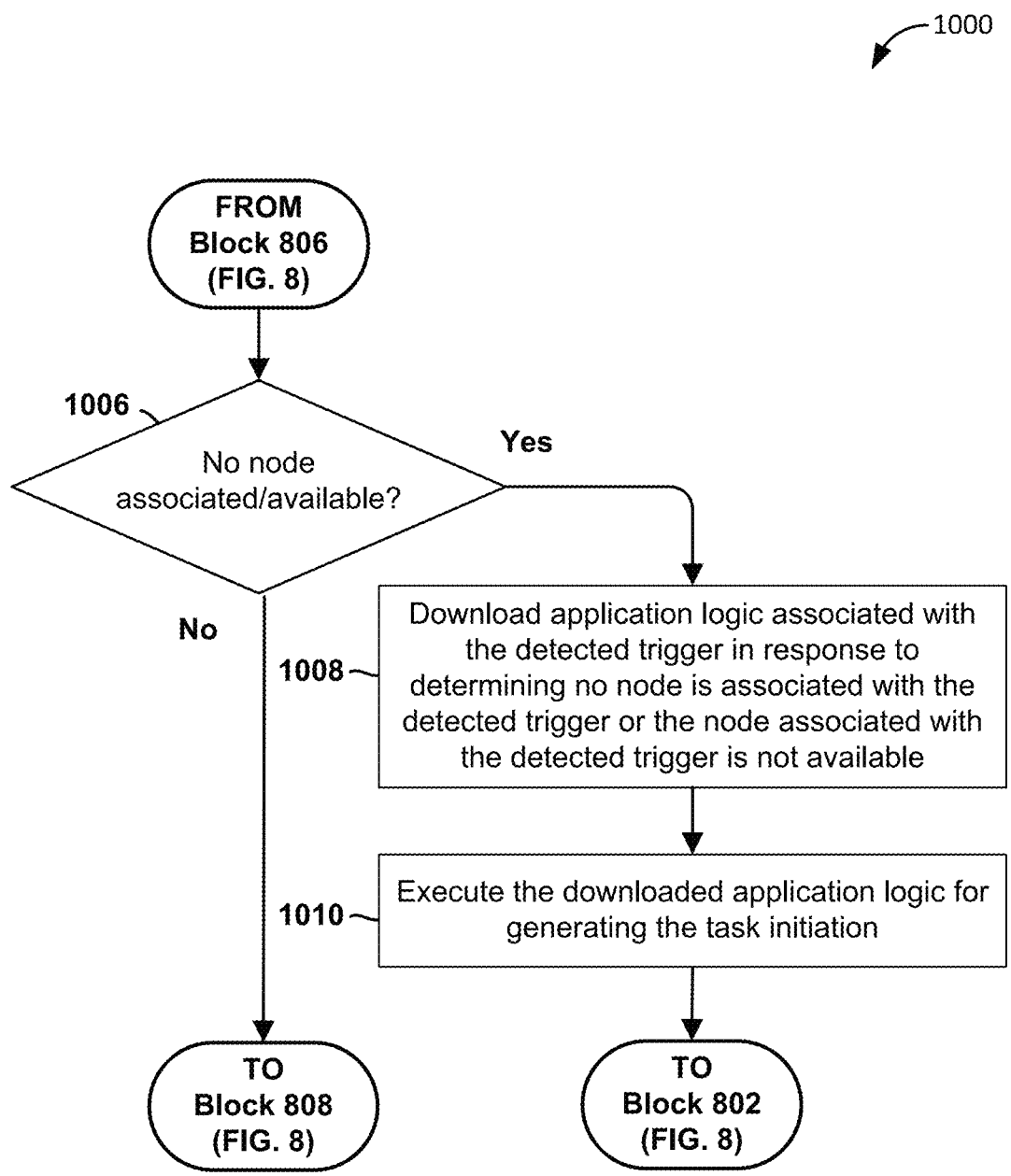
FIG. 10 is a process flow diagram illustrating an embodiment method for distributing trigger-based function execution in a mesh network suitable for use with various embodiments.

FIG. 10 illustrates an embodiment method 1000 of example operations that may be performed as part of the method 800 (FIG. 8) for distributing trigger-based function execution in a mesh network. With reference to FIGS. 1-10, the operations of method 1000 may be performed by a processor (e.g., 210) of a node (e.g., 110, 155), computing device (e.g., 121-128), or server associated with a mesh network (e.g., 100).

In some implementations following the operations of block 806 (FIG. 8), the processor of the detecting node (e.g., Nodes 1-3, 110a-c) may determine in determination block 1006 whether no node is associated with the detected trigger or whether any node is available. In response to the processor of the detecting node (e.g., Nodes 1-3, 110a-c) determining that no node is associated with the detected trigger or that no node is available (i.e., determination block 1006="Yes"), the processor of the detecting node (e.g., Nodes 1-3, 110a-c) may download in block 1008 application logic associated with the detected trigger. Then, in block 1010, the processor of the detecting node (e.g., Nodes 1-3, 110a-c) may execute the downloaded application logic for generating the task initiation. Following the operations of block 1010, the processor of the detecting node (e.g., Nodes 1-3, 110a-c) may follow the operations of block 802 (FIG. 8). In response to the processor of the detecting node (e.g., Nodes 1-3, 110a-c) determining a node is associated with the detected trigger and that node is available (i.e., determination block 1006="No"), the processor of the detecting node (e.g., Nodes 1-3, 110a-c) may follow the operations of block 808 (FIG. 8).

Figure 11:
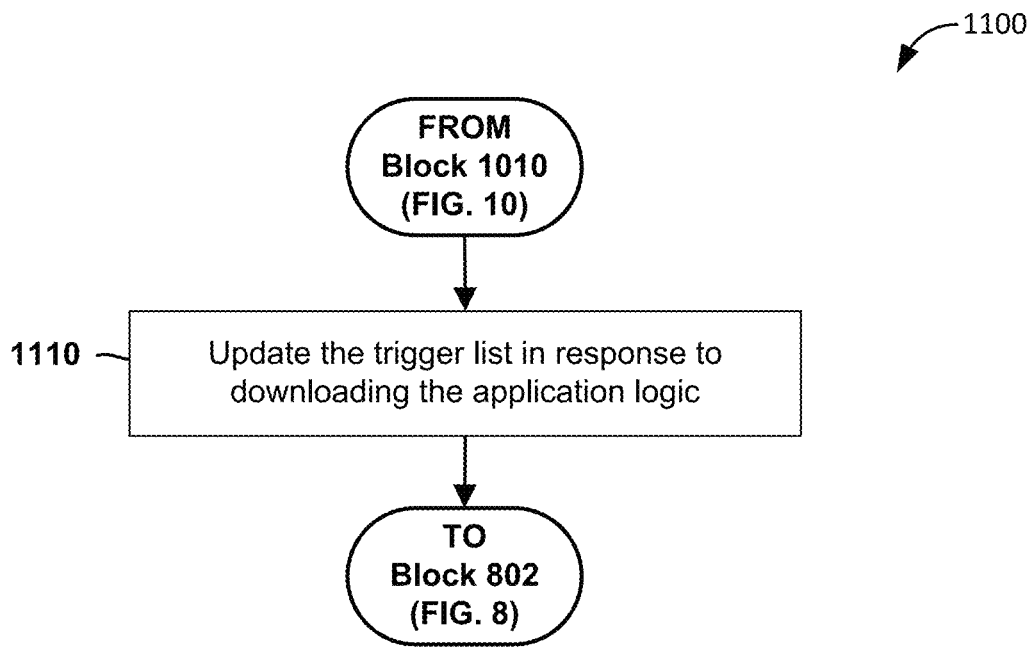
FIG. 11 is a process flow diagram illustrating an embodiment method for distributing trigger-based function execution in a mesh network suitable for use with various embodiments.

FIG. 11 illustrates an embodiment method 1100 of example operations that may be performed as part of the method 1100 (FIG. 11) for distributing trigger-based function execution in a mesh network. With reference to FIGS. 1-11, the operations of method 1100 may be performed by a processor (e.g., 210) of a node (e.g., 110a-c, 155), computing device (e.g., 121-128), or server associated with a mesh network (e.g., 100).

In some implementations following the operations of block 1010 (FIG. 10), the processor of a node (e.g., 110a-c, 155), may update the trigger list in response to downloading the application logic. Following the operations of block 1110, the processor may follow the operations of block 802 (FIG. 8).

Figure 12:
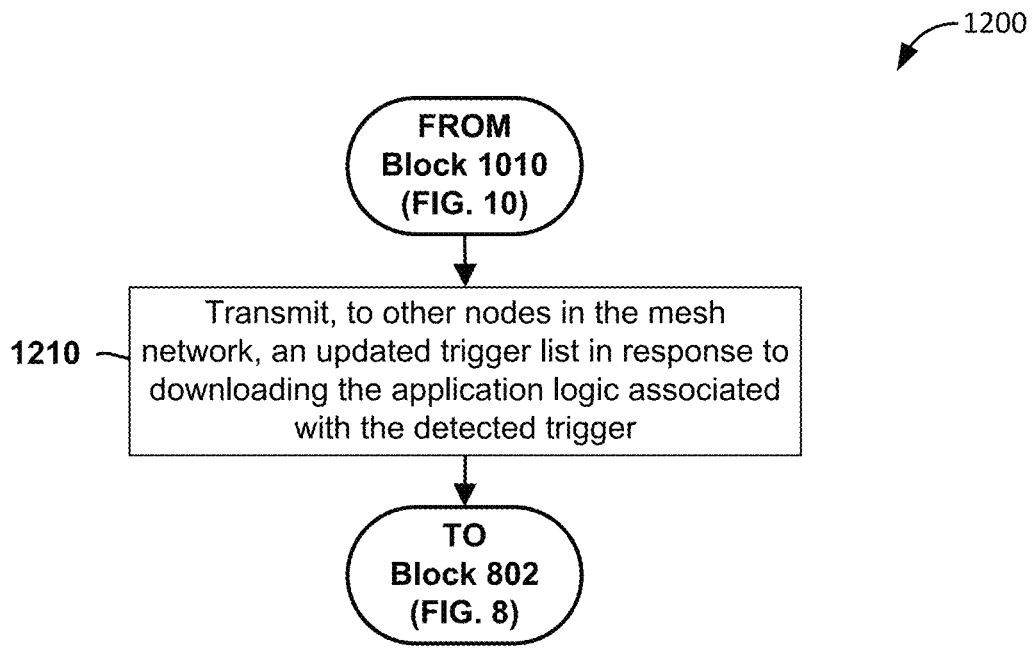
FIG. 12 is a process flow diagram illustrating an embodiment method for distributing trigger-based function execution in a mesh network suitable for use with various embodiments.

FIG. 12 illustrates an embodiment method 1200 of example operations that may be performed as part of the method 1200 (FIG. 12) for distributing trigger-based function execution in a mesh network. With reference to FIGS. 1-12, the operations of method 1200 may be performed by a processor (e.g., 210) of a node (e.g., 110a-c, 155), computing device (e.g., 121-128), or server associated with a mesh network (e.g., 100).

In some implementations following the operations of block 1010 (FIG. 10), the processor may in block 1210 transmit to other nodes in the mesh network an updated trigger list in response to downloading the application logic associated with the detected trigger. Following the operations of block 1210, the processor may follow the operations of block 802 (FIG. 8).

Figure 13:
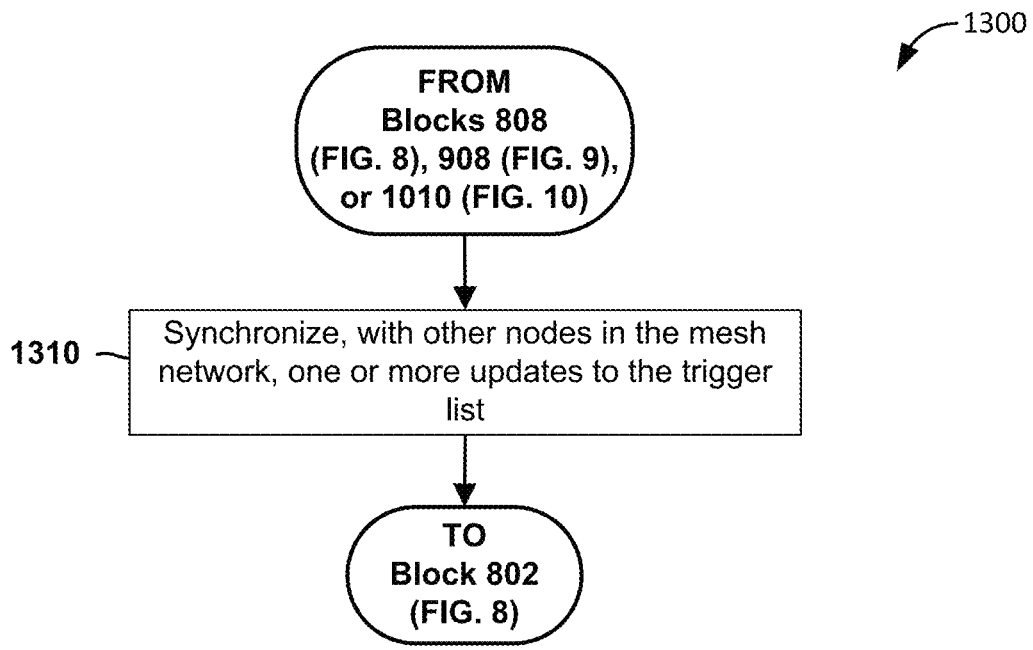
FIG. 13 is a process flow diagram illustrating an embodiment method for distributing trigger-based function execution in a mesh network suitable for use with various embodiments.

FIG. 13 illustrates an embodiment method 1300 of example operations that may be performed as part of the methods 800 (FIG. 8), 900 (FIG. 9), or 1000 (FIG. 10) for distributing trigger-based function execution in a mesh network. With reference to FIGS. 1-13, the operations of method 1300 may be performed by a processor (e.g., 210) of a node (e.g., 110a-c, 155), computing device (e.g., 121-128), or server associated with a mesh network (e.g., 100).

In some implementations following the operations of block 808 (FIG. 8), block 908 (FIG. 9), or block 1010 (FIG. 10), the processor may in block 1310 synchronize, with other nodes in the mesh network, one or more updates to the trigger list. Following the operations of block 1310, the processor may follow the operations of block 802 (FIG. 8).

Figure 14:
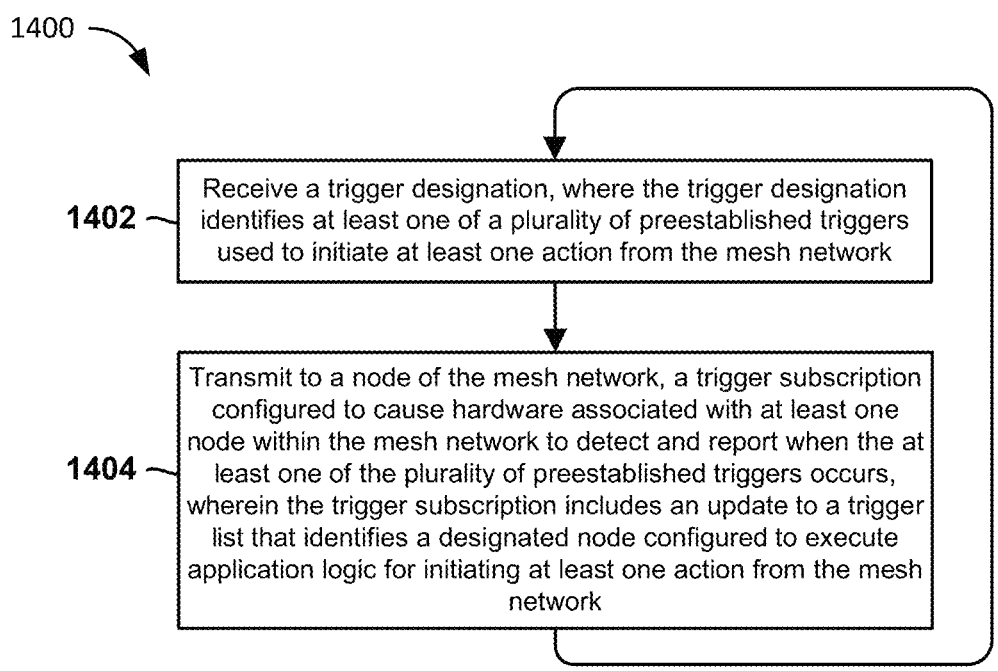
FIG. 14 is a process flow diagram illustrating an embodiment method for distributing trigger-based function execution in a mesh network suitable for use with various embodiments.

FIG. 14 illustrates an embodiment method 1400 for distributing trigger-based function execution in a mesh network, in accordance with various embodiments. With reference to FIGS. 1-14, the operations of the method 1400 may be performed by a processor (e.g., 210) of a node (e.g., 110a-c, 155), computing device (e.g., 121-128), or server associated with a mesh network (e.g., 100).

In block 1402, the processor may receive a trigger designation. The trigger designation may identify at least one of a plurality of preestablished triggers used to initiate at least one action from the mesh network.

In block 1404, the processor may cause a transmitter to transmit, from the processor to a node of the mesh network, a trigger subscription configured to cause hardware associated with at least one node within the mesh network to detect and report when the at least one of the plurality of preestablished triggers occurs. The trigger subscription may include an update to a trigger list that identifies a designated node configured to execute application logic for initiating at least one action from the mesh network.

In some embodiments, the processor may repeat any or all of the operations in blocks 1402 and 1404 to repeatedly or continuously receive trigger designations and transmit a trigger subscription.

Figure 15:
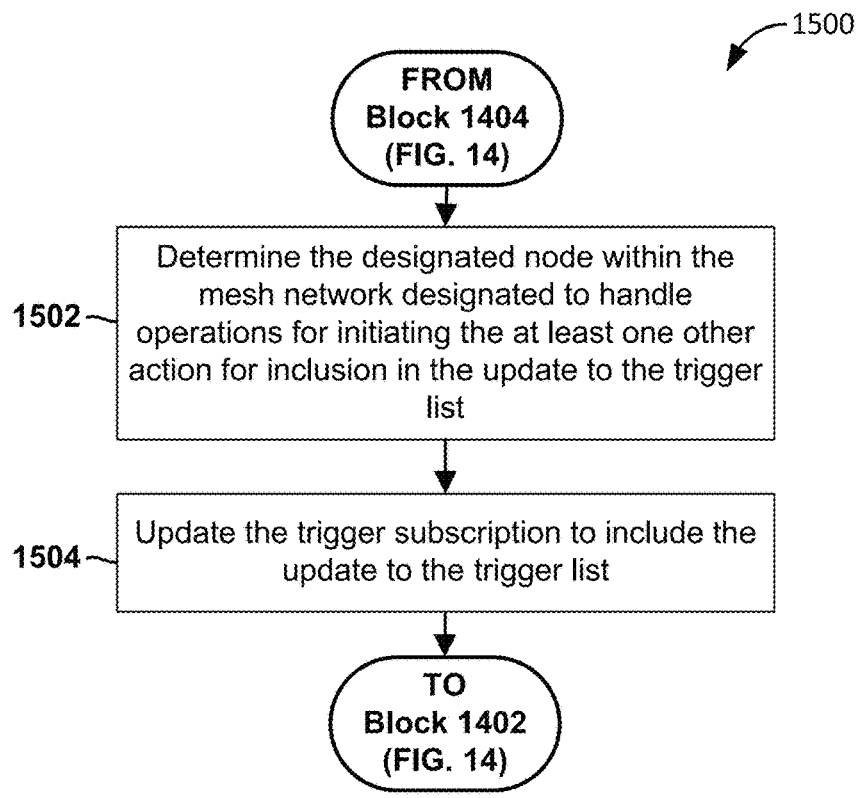
FIG. 15 is a process flow diagram illustrating an embodiment method for distributing trigger-based function execution in a mesh network suitable for use with various embodiments.

FIG. 15 illustrates an embodiment method 1500 of example operations that may be performed as part of the method 1400 (FIG. 14) for distributing trigger-based function execution in a mesh network. With reference to FIGS. 1-15, the operations of method 1500 may be performed by a processor (e.g., 210) of a node (e.g., 110a-c, 155), computing device (e.g., 121-128), or server associated with a mesh network (e.g., 100).

In some implementations following the operations of block 1404 (FIG. 14), the processor of a detecting node (e.g., 110a-c, 155) may in block 1502 determine the designated node within the mesh network designated to handle operations for initiating the at least one other action for inclusion in the update to the trigger list. Then, in block 1504, the processor of the detecting node (e.g., 110a-c, 155) may update the trigger subscription to include the update to the trigger list. Following the operations of block 1504, the processor of the detecting node (e.g., 110a-c, 155) may follow the operations of block 1402 (FIG. 14).

Figure 16:
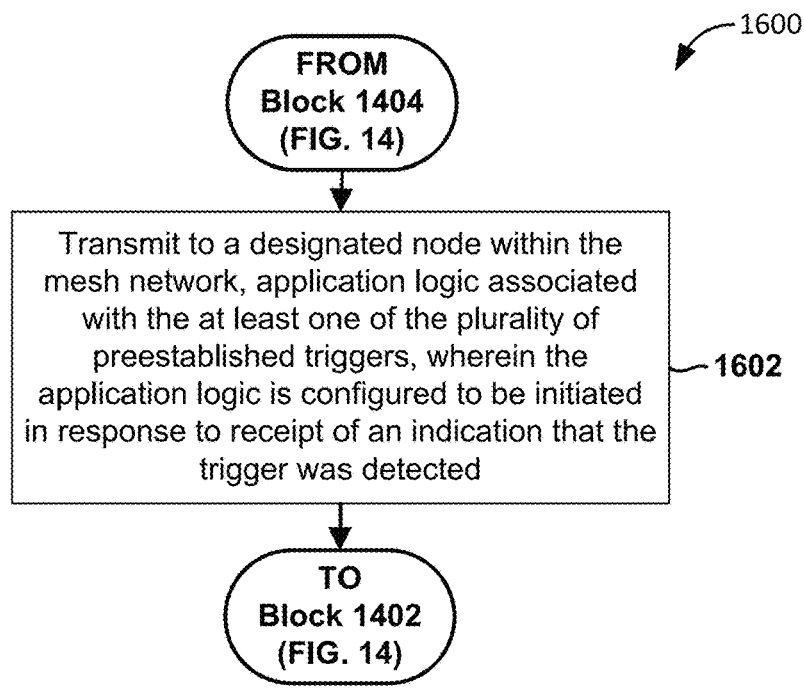
FIG. 16 is a process flow diagram illustrating an embodiment method for distributing trigger-based function execution in a mesh network suitable for use with various embodiments.

FIG. 16 illustrates an embodiment method 1600 of example operations that may be performed as part of the method 1400 (FIG. 14) for distributing trigger-based function execution in a mesh network. With reference to FIGS. 1-16, the operations of method 1600 may be performed by a processor (e.g., 210) of a node (e.g., 110a-c, 155), computing device (e.g., 121-128), or server associated with a mesh network (e.g., 100).

In some implementations following the operations of block 1404 (FIG. 14), the processor of the detecting node (e.g., 110a-c, 155) may, in block 1602, transmit to a designated node within the mesh network, application logic associated with the at least one of the plurality of preestablished triggers. The application logic may be configured to be initiated in response to receipt of an indication that the trigger was detected. Following the operations of block 1602, the processor of the detecting node (e.g., 110a-c, 155) may follow the operations of block 1402 (FIG. 14).

Figure 17:
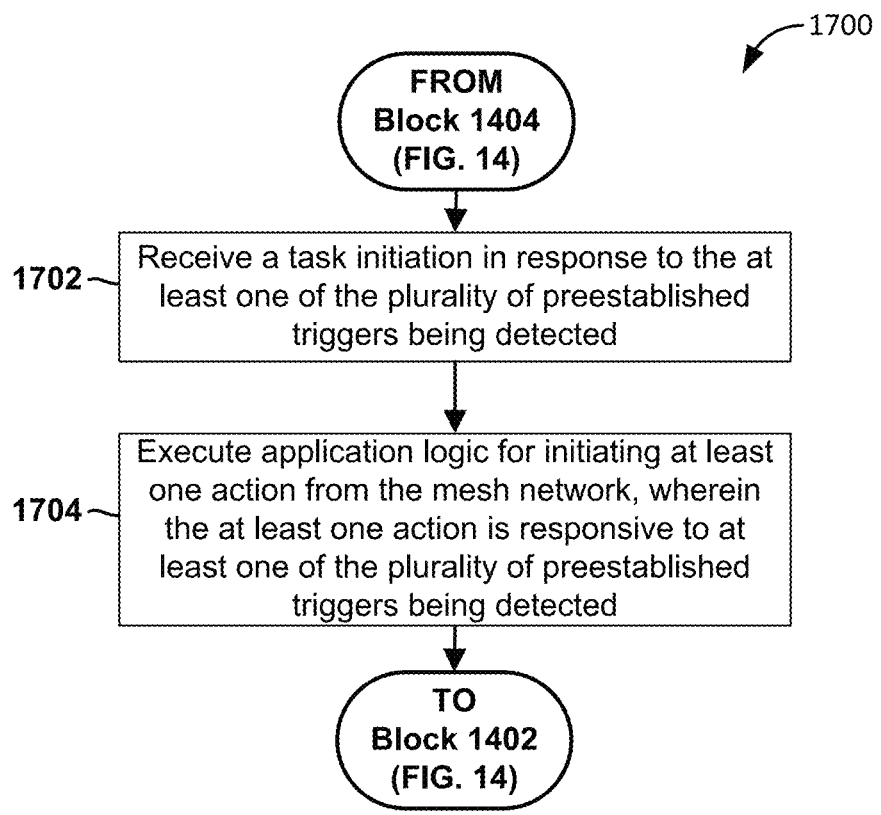
FIG. 17 is a process flow diagram illustrating an embodiment method for distributing trigger-based function execution in a mesh network suitable for use with various embodiments.

FIG. 17 illustrates an embodiment method 17 00 of example operations that may be performed as part of the method 1400 (FIG. 14) for distributing trigger-based function execution in a mesh network. With reference to FIGS. 1-17, the operations of method 17 00 may be performed by a processor (e.g., 210) of a node (e.g., 110a-c, 155), computing device (e.g., 121-128), or server associated with a mesh network (e.g., 100).

In some implementations following the operations of block 1404 (FIG. 14), the processor of the detecting node (e.g., 110a-c, 155) may, in block 1702, receive a task initiation in response to the at least one of the plurality of preestablished triggers being detected. Then, in block 1704, the processor of the detecting node (e.g., 110a-c, 155) may execute application logic for initiating at least one action from the mesh network. The at least one action may be responsive to at least one of the plurality of preestablished triggers being detected. Following the operations of block 1704, the processor of the detecting node (e.g., 110a-c, 155) may follow the operations of block 1402 (FIG. 14).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 800, 900, 1000, 1100, 1200, 1300, 1400, 1500, 1600, 1700 may be substituted for or combined with one or more operations of the methods 800, 900, 1000, 1100, 1200, 1300, 1400, 1500, 1600, 1700 and vice versa.

Figure 18:
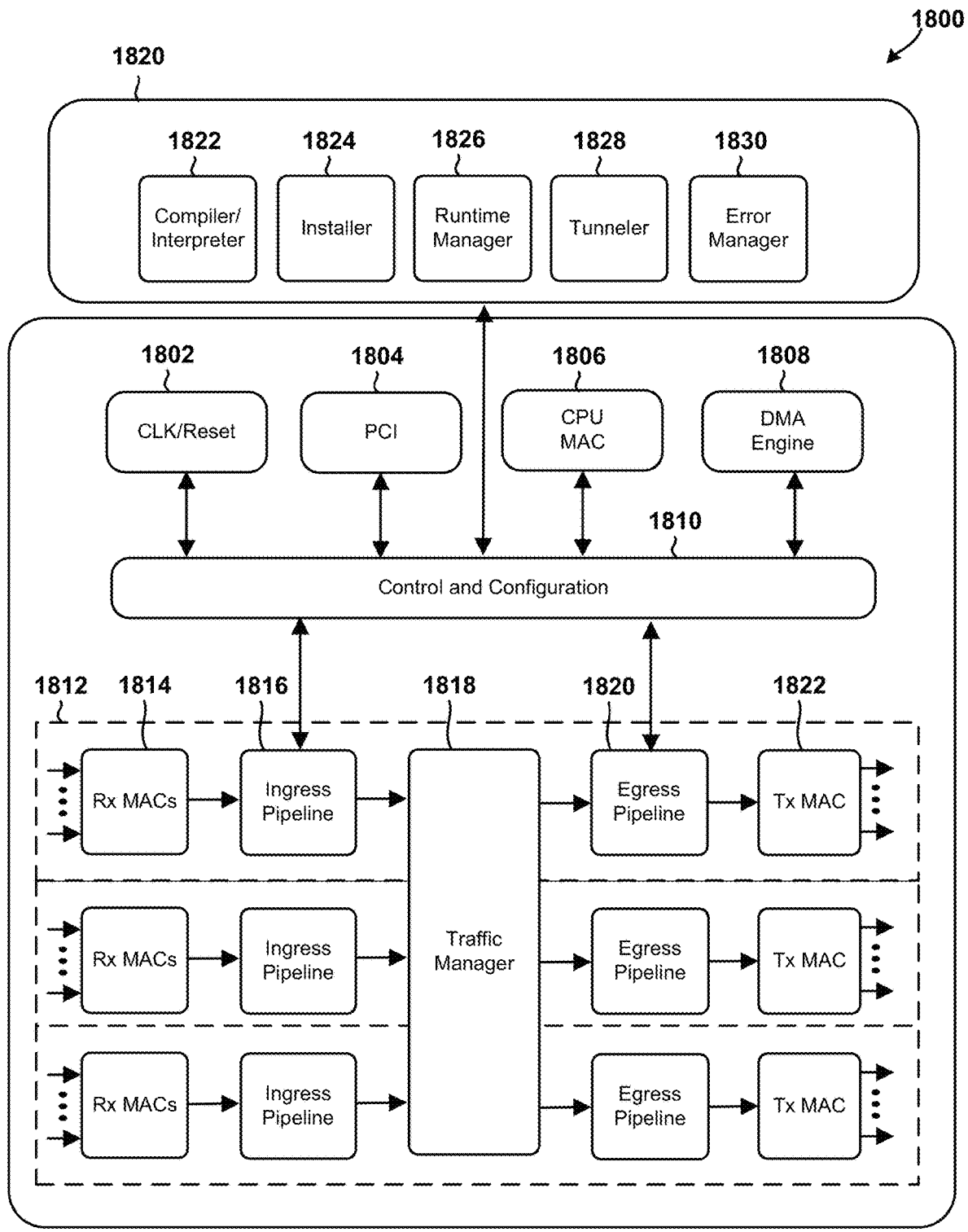
FIG. 18 is a component diagram of a computing device in the form of a node configured to operate in a mesh network, suitable for use with various embodiments.

The various embodiments (including, but not limited to, embodiments discussed above with reference to FIGS. 1-17), may be implemented in any of a variety of computing devices (e.g., a node), an example of which is illustrated in FIG. 18. The system 1800 includes a clock/reset component 1802, a peripheral component interconnect (PCI) component 1804, a central processing unit (CPU) media access control (MAC) component 1806, a direct memory access (DMA) engine component 1808, and a control and configuration component 1810. The system 1800 includes a plurality of processing blocks 1812 that implement a switch architecture that could be partitioned and/or controlled by the various embodiments. In the illustrated example, the processing blocks 1812 each include or utilize a receiver MACs component 1814, an ingress pipeline component 1816, a traffic manager component 1818, an egress pipeline component 1820, and a transmission MAC component 1822.

The system 1800 illustrated in FIG. 18 further includes an integrated switch management plane 1830 that includes a compiler or interpreter component 1832, an installer component 1834, a runtime manager component 1836, a tunneler component 1838, and an error manager component 1840. The compiler or interpreter component 1832 may be configured to receive and compile the code segments into domain-specific binary code that is suitable for execution on a packet processor, or via the runtime manager 1836 and/or CPU MAC component 1806. The installer component 1834 may be configured to install the domain-specific binary code for execution via the packet processor, or via the runtime manager 1836 and/or CPU MAC component 1806. As mentioned above, the efficient installation of locally compiled domain-specific binary code enables the system to quickly and efficiently augment or alter the functionality of a deployed network component in real time, while in service. The runtime manager component 1826 may be configured to manage the runtime system or execution environment. The tunneler component 1838 may be configured to establish a high speed data forwarding tunnel for communicating with a control server. The error manager component 1840 may be configured to perform various error response operations.

Figure 19:
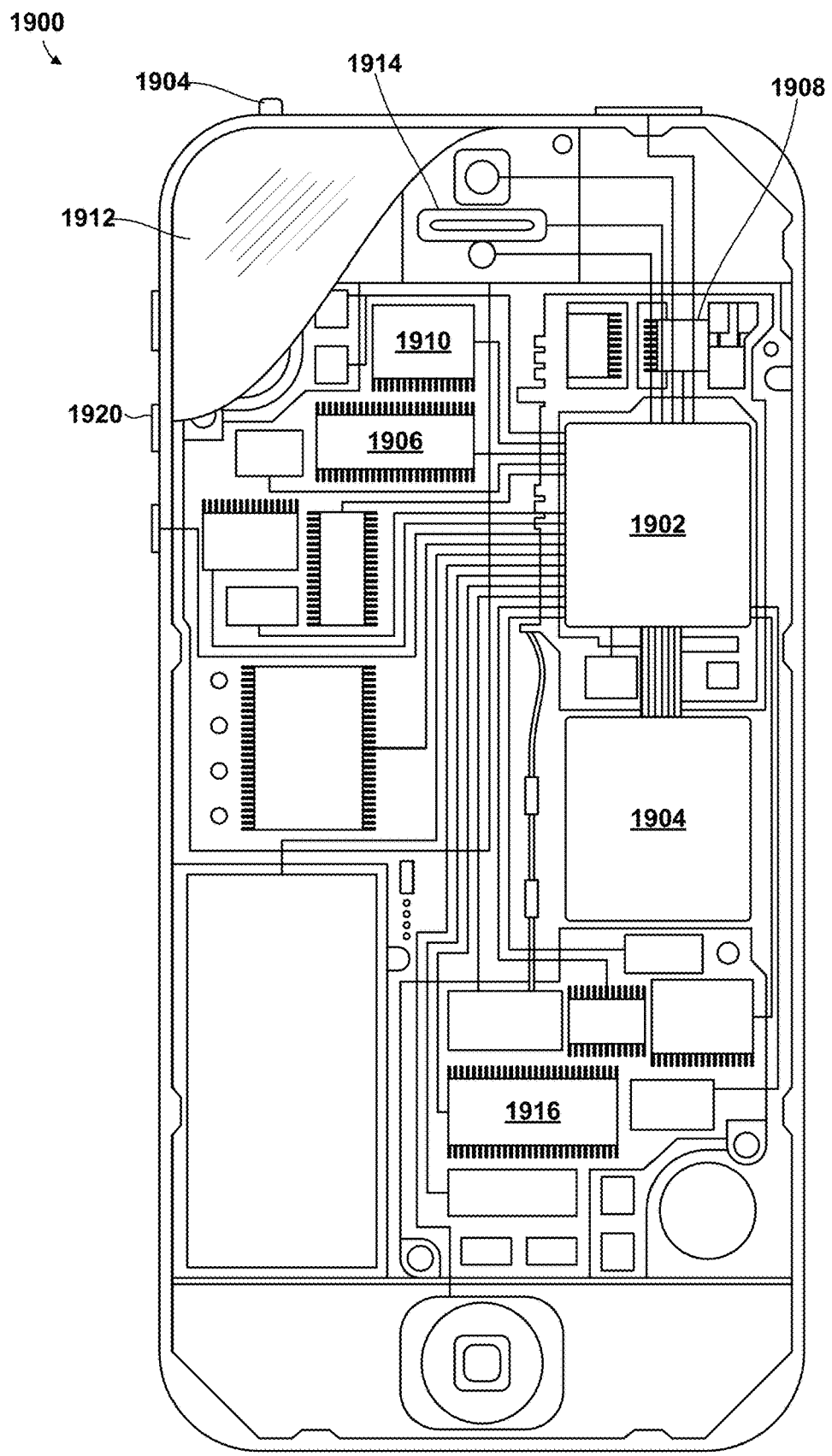
FIG. 19 is a component diagram of an example client device in the form of a smartphone, suitable for use with the various embodiments.
Figure 20:
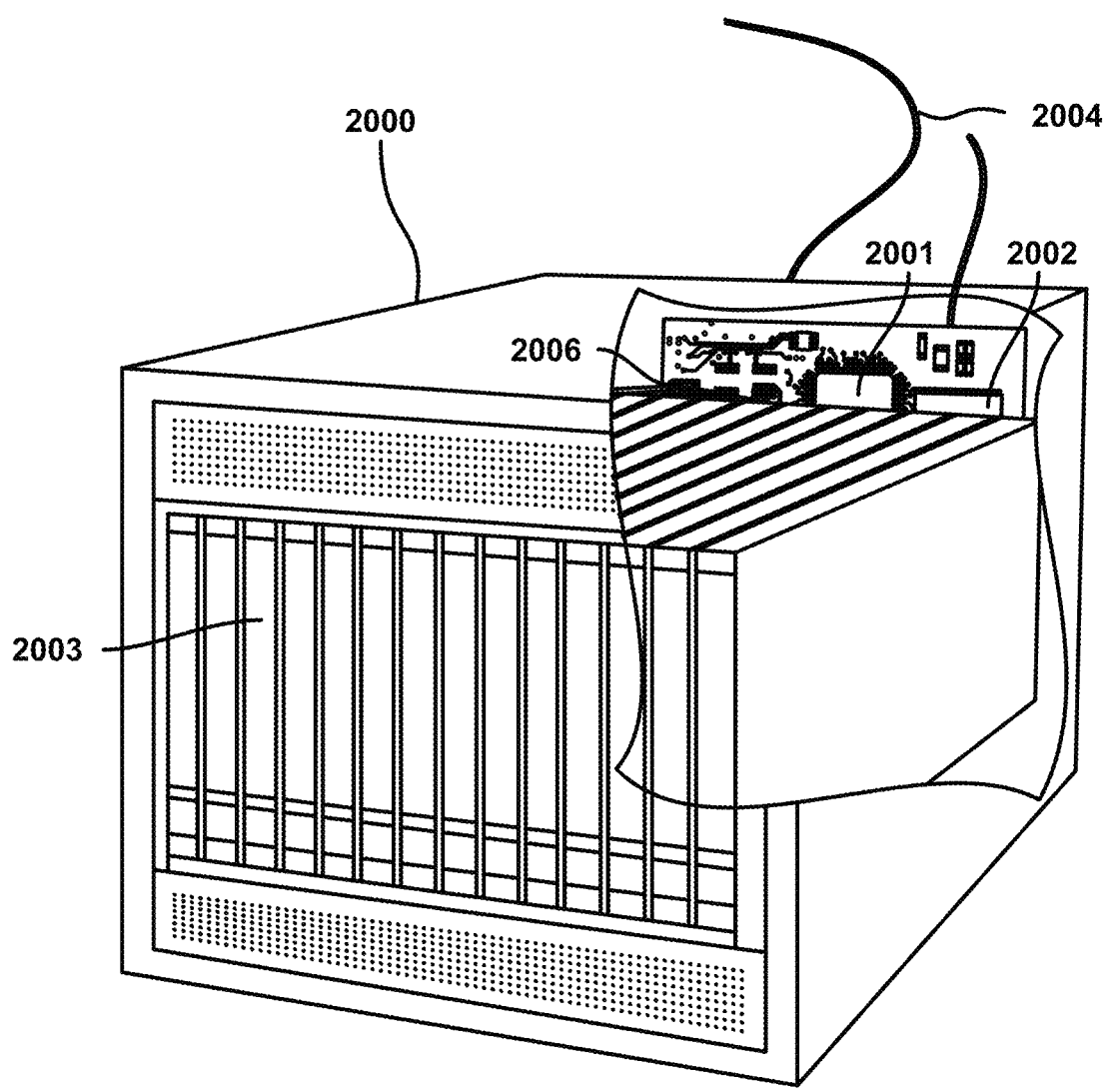
FIG. 20 is a component diagram of an example server suitable for use with the various embodiments.

FIG. 19 shows a component block diagram of an example client device. Various embodiments may be implemented on a variety of wireless devices (such the cell phone 121 client devices), an example of which is illustrated in FIG. 19 in the form of a smailphone 1900. The smailphone 1900 may include a first system-on-chip (SOC) 1902 (such as a SOC-CPU) coupled to a second SOC 1904 (such as a 5G capable SOC). The first and second SOCs 1902, 1904 may be coupled to internal memory 1906, 1916, a display 1912, and to a speaker 1914. Additionally, the smailphone 1900 may include an antenna 1924 for sending and receiving electromagnetic radiation that may be connected to a wireless data link or cellular telephone transceiver 1908 coupled to one or more processors in the first or second SOCs 1902, 1904. Smartphones 1900 typically also include menu selection buttons or rocker switches 1920 for receiving user inputs.

A typical smailphone 1900 also includes a sound encoding/decoding (CODEC) circuit 1910, which digitizes sound received from a microphone into data packets suitable for wireless transmission and decodes received sound data packets to generate analog signals that are provided to the speaker to generate sound. Also, one or more of the processors in the first and second SOCs 1902, 1904, wireless transceiver 1908 and CODEC 1910 may include a digital signal processor (DSP) circuit (not shown separately).

The processors of the smailphone 1900 may be any programmable microprocessor, microcomputer or multiple processor chip or chips that can be configured by software instructions (applications) to perform a variety of functions, including the functions of the various implementations described below. In some mobile devices, multiple processors may be provided, such as one processor within a system-on-chip (SOC) dedicated to wireless communication functions and one processor within another SOC dedicated to running other applications. Typically, software applications may be stored in the memory 1906, 1916 before they are accessed and loaded into the processor. The processors may include internal memory sufficient to store the application software instructions.

Various embodiments (including, but not limited to, embodiments discussed above with reference to FIGS. 1-19) may be implemented on any of a variety of commercially available server devices, such as the cloud-based node 155 illustrated in FIG. 1. The server 155 illustrated in FIG. 1 and described with regard to FIGS. 5-7 may include the same or similar elements as the server 2000. The server 2000 may include a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing data connections with a network connection circuit 2005 and a communication network (e.g., IP network) coupled to other communication system network elements.

The processors 210, 1806, 1902, 1904, 2001 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 210, 1806, 1902, 1904, 2001. The processors 210, 1806, 1902, 1904, 2001 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 210, 1806, 1902, 1904, 2001 including internal memory or removable memory plugged into the device and memory within the processors 210, 1806, 1902, 1904, 2001 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers.

Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for distributing trigger-based function execution in a mesh network with a plurality of nodes, the method comprising:
    detecting, by a processor of a detecting node among the plurality of nodes in the mesh network, a trigger;
    transmitting, to an available node among the plurality of nodes, a trigger detection indicator associated with the detected trigger in response to the detected trigger matching one of a plurality of network events included in a trigger list and a node other than the detecting node that is available being identified on the trigger list as a node associated with the detected trigger, wherein the trigger detection indicator is configured to cause the available node associated with the detected trigger to execute application logic for initiating at least one action of controlling the operation of a client device that is remote from the node associated with the detected trigger; and
    executing, by the processor, the application logic for initiating the at least one action of controlling the operation of the client device connected to the mesh network in response to the detected trigger matching one of the plurality of network events included in the trigger list and the detecting node being identified on the trigger list as the node associated with the detected trigger.

2. The method of claim 1, further comprising:
    downloading, by the processor, the application logic associated with the detected trigger in response to determining no node is associated with the detected trigger or the node associated with the detected trigger is not available, wherein executing the application logic for initiating the at least one action is in response to downloading the application logic.

3. The method of claim 2, further comprising:
    updating, by the processor, the trigger list in response to downloading the application logic.

4. The method of claim 2, further comprising:
    transmitting, by the processor to other nodes in the mesh network, an updated trigger list in response to downloading the application logic associated with the detected trigger.

5. The method of claim 1, further comprising:
    synchronizing, by the processor with other nodes in the mesh network, one or more updates to the trigger list.

6. A computing device connected to other devices operating with the computing device as a plurality of nodes in a mesh network, comprising:
    a transceiver; and
    a processor coupled to the transceiver, wherein the processor is configured with processor-executable instructions to perform operations for distributing trigger-based function execution from the computing device, the operations comprising:
    detecting a trigger;
    signaling the transceiver to transmit to an available node, among the plurality of nodes, a trigger detection indicator associated with the detected trigger in response to the detected trigger matching one of a plurality of network events included in a trigger list and a node other than the computing device that is available being identified on the trigger list as a node associated with the detected trigger, wherein the trigger detection indicator is configured to cause the available node associated with the detected trigger to execute application logic for initiating at least one action of controlling the operation of a client device that is remote from the node associated with the detected trigger; and
    executing, by the processor, the application logic for initiating the at least one action of controlling the operation of the client device connected to the mesh network in response to the detected trigger matching one of the plurality of network events included in the trigger list and the computing device being identified on the trigger list as the node associated with the detected trigger.

7. The computing device of claim 6, wherein the processor is configured with processor-executable instructions to perform operations further comprising:
    downloading application logic associated with the detected trigger in response to determining no node is associated with the detected trigger or the node associated with the detected trigger is not available, wherein executing the application logic for initiating the at least one action is in response to downloading the application logic.

8. The computing device of claim 7, wherein the processor is configured with processor-executable instructions to perform operations further comprising:
    updating the trigger list in response to downloading the application logic.

9. The computing device of claim 7, wherein the processor is configured with processor-executable instructions to perform operations further comprising:
    transmitting, to other nodes in the mesh network, an updated trigger list in response to downloading the application logic associated with the detected trigger.

10. The computing device of claim 6, wherein the processor is configured with processor-executable instructions to perform operations further comprising:
    synchronizing, with other nodes in the mesh network, one or more updates to the trigger list.

11. A non-transitory processor-readable storage medium having stored thereon processor-executable instructions configured to cause a processor to perform operations for distributing trigger-based function execution from a detecting node among a plurality of nodes in a mesh network, the operations comprising:
    detecting a trigger;
    transmitting, to an available node among the plurality of nodes, a trigger detection indicator associated with the detected trigger in response to the detected trigger matching one of a plurality of network events included in a trigger list and a node other than the detecting node that is available being identified on the trigger list as a node associated with the detected trigger, wherein the trigger detection indicator is configured to cause the available node associated with the detected trigger to execute application logic for initiating at least one action of controlling the operation of a client device that is remote from the node associated with the detected trigger; and executing, by the processor, the application logic for initiating the at least one action of controlling the operation of the client device connected to the mesh network in response to the detected trigger matching one of the plurality of network events included in the trigger list and the detecting node being identified on the trigger list as the node associated with the detected trigger.

12. The non-transitory processor-readable storage medium of claim 11, wherein the stored processor-executable instructions are configured to cause the processor to perform operations further comprising:

downloading application logic associated with the detected trigger in response to determining no node is associated with the detected trigger or the node associated with the detected trigger is not available, wherein executing the application logic for initiating the at least one action is in response to downloading the application logic.

13. The non-transitory processor-readable storage medium of claim 12, wherein the stored processor-executable instructions are configured to cause the processor to perform operations further comprising:

updating the trigger list in response to downloading the application logic.

14. The non-transitory processor-readable storage medium of claim 12, wherein the stored processor-executable instructions are configured to cause the processor to perform operations further comprising:

transmitting, to other nodes in the mesh network, an updated trigger list in response to downloading the application logic associated with the detected trigger.

15. The non-transitory processor-readable storage medium of claim 11, wherein the stored processor-executable instructions are configured to cause the processor to perform operations further comprising:

synchronizing, with other nodes in the mesh network, one or more updates to the trigger list.

* * * * *